United States Patent
Jang et al.

(10) Patent No.: US 9,554,127 B2
(45) Date of Patent: Jan. 24, 2017

(54) DISPLAY APPARATUS, METHOD FOR CONTROLLING THE DISPLAY APPARATUS, GLASSES AND METHOD FOR CONTROLLING THE GLASSES

(71) Applicant: SAMSUNG ELECTRONICS CO., LTD., Suwon-si (KR)

(72) Inventors: Young-ick Jang, Seoul (KR); Yeun-bae Kim, Seongnam-si (KR); Chang-yong Kim, Yongin-si (KR); Seung-kwon Park, Yongin-si (KR); Jea-hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 14/085,389

(22) Filed: Nov. 20, 2013

(65) Prior Publication Data
US 2014/0146124 A1    May 29, 2014

(30) Foreign Application Priority Data

Nov. 23, 2012   (KR) .......................... 10-2012-0133927

(51) Int. Cl.
*H04N 13/04*    (2006.01)
*H04N 7/14*     (2006.01)

(52) U.S. Cl.
CPC .......... *H04N 13/0497* (2013.01); *H04N 7/141* (2013.01); *H04N 13/0434* (2013.01);
(Continued)

(58) Field of Classification Search
USPC ....................................................... 348/14.03
See application file for complete search history.

(56) References Cited

U.S. PATENT DOCUMENTS 8,245,258 B2    8/2012 Park et al.
8,483,613 B2 *  7/2013 Hua ...................... H04W 76/02
                                                   455/41.1
(Continued)

FOREIGN PATENT DOCUMENTS

EP              2251856 A2    11/2010
KR      10-2009-0046312 A      5/2009
(Continued)

OTHER PUBLICATIONS

International Search Report (PCT/ISA/210), dated Mar. 5, 2014, issued by the International Searching Authority in counterpart International Patent Application No. PCT/KR2013/010189.

(Continued)

*Primary Examiner* — Amal Zenati
(74) *Attorney, Agent, or Firm* — Sughrue Mion, PLLC

(57) ABSTRACT

A display apparatus for providing a multi view mode along with glasses is provided. The display apparatus includes a communicator which communicates with the glasses, a display which displays multiple contents respectively, a screen telephony performer which performs screen telephony with another display apparatus, and a controller. The controller controls the communicator to transmit a user's voice received from the another display apparatus to the glasses, when the screen telephony with another display apparatus is performed, and which controls the display to display screen telephony images received from the another display apparatus and one content from among the multiple contents in a multi view mode.

23 Claims, 13 Drawing Sheets

(52) U.S. Cl.
CPC . *H04N 13/0438* (2013.01); *H04N 2013/0463* (2013.01); *H04N 2013/0465* (2013.01); *H04N 2213/008* (2013.01)

(56) References Cited

U.S. PATENT DOCUMENTS

| | | |
|---|---|---|
| 2007/0230736 A1 | 10/2007 | Boesen |
| 2009/0119725 A1* | 5/2009 | Park .................. H04N 7/14 |
| | | 725/106 |
| 2010/0007582 A1* | 1/2010 | Zalewski ............ A63F 13/00 |
| | | 345/8 |
| 2011/0254934 A1 | 10/2011 | Yoon et al. |
| 2012/0004919 A1 | 1/2012 | Muth |
| 2012/0098945 A1 | 4/2012 | McKiel, Jr. |
| 2012/0162352 A1 | 6/2012 | Ida |

FOREIGN PATENT DOCUMENTS

| | | |
|---|---|---|
| KR | 10-2011-0115806 A | 10/2011 |
| KR | 10-2011-0136325 A | 12/2011 |
| KR | 10-2012-0037813 A | 4/2012 |
| WO | 2011/100237 A1 | 8/2011 |

OTHER PUBLICATIONS

Written Opinion (PCT/ISA/237), dated Mar. 5, 2014, issued by the International Searching Authority in counterpart International Patent Application No. PCT/KR2013/010189.
Communication dated Jun. 9, 2016, issued by the European Patent Office in counterpart European Application No. 13856312.7.

* cited by examiner

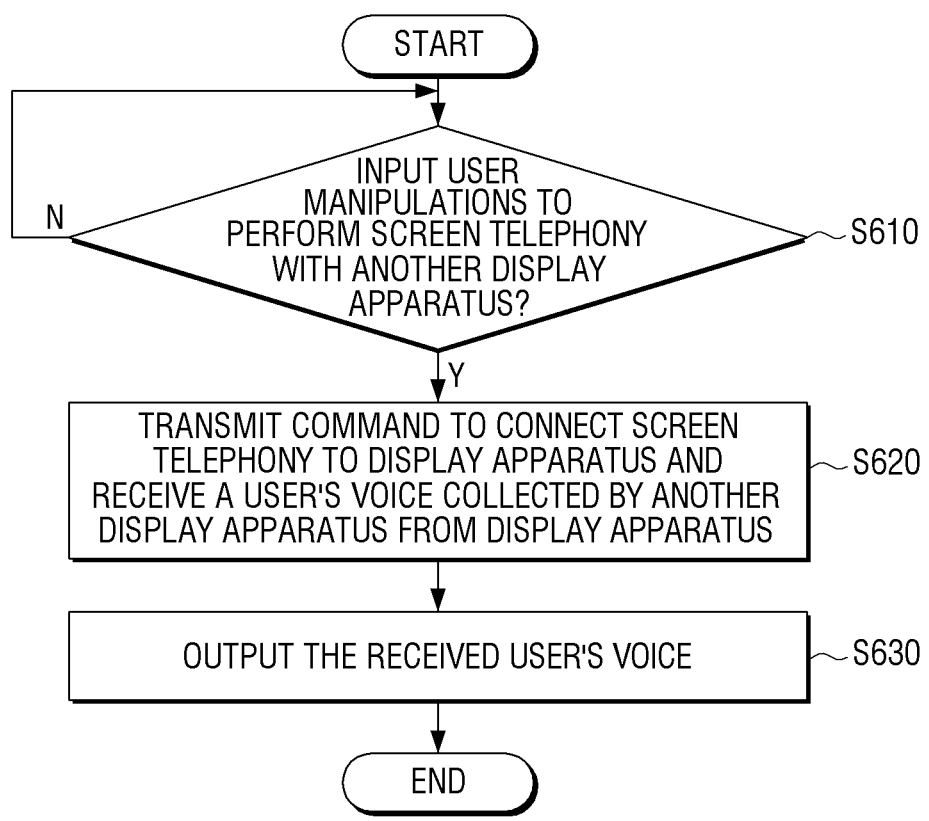

DISPLAY APPARATUS, METHOD FOR CONTROLLING THE DISPLAY APPARATUS, GLASSES AND METHOD FOR CONTROLLING THE GLASSES

CROSS-REFERENCE TO RELATED APPLICATIONS

This application claims priority from Korean Patent Application No. 10-2012-133927, filed on Nov. 23, 2012, in the Korean Intellectual Property Office, the disclosure of which is herein incorporated by reference in its entirety.

BACKGROUND

1. Field

Apparatuses and methods consistent with what is disclosed herein relate to a display apparatus, a method for controlling the display apparatus, glasses and a method for controlling the glasses, and more specifically, to a display apparatus which provides different contents to a plurality of users, a controlling method thereof, glasses and a controlling method thereof.

2. Description of the Related Art

Empowered with electronic technology development, various types of electronic produces are invented and distributed. Specifically, various display apparatuses such as televisions (TVs), cellular phones, personal computers (PCs), laptop computers, and personal digital assistants (PDAs) are used in many households.

As use of display apparatuses increases, the scope of functions also increases. Thus, products having new functions which were not served before, such as providing 3D contents, are launched.

Further, efforts are recently made to develop a display apparatus in which a plurality of contents are simultaneously provided and a plurality of users can watch different contents simultaneously.

Meanwhile, display apparatuses can connect to the Internet and communicate with other display apparatuses. Thus, it would be advantageous to have a method with which it is possible that users of the display apparatuses can properly conduct screen telephony with users of the other display apparatuses, while the users are watching different contents, respectively.

SUMMARY

Exemplary embodiments overcome the above disadvantages and other disadvantages not described above. Also, the present inventive concept is not required to overcome the disadvantages described above, and an exemplary embodiment may not overcome any of the disadvantages described above.

According to one or more embodiments there is provided a display apparatus which properly performs screen telephony with another display apparatus when users view respectively desired contents through display apparatuses providing a multi view mode, a controlling method thereof, glasses and a controlling method thereof.

According to an aspect of an exemplary embodiment, there is provided a display apparatus for providing a multi view mode along with glasses, the display apparatus including a communicator which communicates with the glasses, a display which displays a plurality of contents respectively, a screen telephony performer which performs screen telephony with another display apparatus, and a controller which controls the communicator to transmit a user's voice received from the another display apparatus to the glasses, when the screen telephony with another display apparatus is performed, and which controls the display to display screen telephony images received from the another display apparatus and one content from among the plurality of contents in the multi view mode.

The communicator may communicate with the glasses, and transmit synchronizing signals corresponding to the one content from among the plurality of contents.

The communicator may receive a user's voice collected at the glasses, and the screen telephony performer may include a camera which photographs a user and generates screen telephony images, and an interface which transmits the photographed screen telephony images and the user's voice received from the glasses to the another display apparatus, and receives screen the telephony images generated at the another display apparatus and a user's voice collected at the another display apparatus from the another display apparatus.

In response to receiving a request for connecting screen telephony from the another display apparatus, the controller may control so that a user interface (UI) screen asking whether to connect screen telephony is overlapped and displayed on each of the plurality of contents.

In response to receiving a command to connect screen telephony from the glasses, the controller may control so that the screen telephony images received from the another display apparatus are displayed at a display timing of contents synchronized with the glasses so as to alternately display one content from among the plurality of contents and the screen telephony images received from the another display apparatus.

In response to receiving a command to connect screen telephony from the glasses, the controller may control so that the telephony images received from the another display apparatus are overlapped and displayed at a display timing of one content and at a display timing of the other contents, from among the plurality of contents.

The communicator may include a Bluetooth communication module.

According to an aspect of another exemplary embodiment, there is provided glasses including a communicator which communicates with a display apparatus, an input which receives a user manipulation to perform screen telephony with another display apparatus, a controller which controls the communicator to transmit a command to connect screen telephony to the display apparatus and to receive from the display apparatus a user's voice collected at the another display apparatus, when the user manipulation is input, and a voice output which outputs the received user's voice.

The communicator may communicate with the display apparatus and receive synchronizing signals that correspond to one content from among a plurality of contents.

The display apparatus may display screen telephony images received from the another display apparatus at a display timing of the contents synchronized with the glasses, when receiving the command to connect screen telephony from the glasses.

The glasses may additionally include a first shutter glasses, and a second shutter glasses, and the controller may control so that the first shutter glasses and second shutter glasses are open at a display timing of screen telephony images received from the another display apparatus based on the synchronizing signals.

The glasses may additionally include a voice collector which collects a user's voice, and the controller may control the communicator to transmit the user's voice collected at the voice collector to the display apparatus.

The communicator may include a Bluetooth communication module.

According to an aspect of another exemplary embodiment, there is provided a controlling method of a display apparatus for providing a multi view mode along with glasses, the controlling method including displaying a plurality of contents respectively, and transmitting a user's voice received from another display apparatus to the glasses, when the screen telephony with another display apparatus is performed, and displaying to display screen telephony images received from the another display apparatus and one content from among the plurality of contents in a multi view mode.

The controlling method may additionally include performing communication with the glasses and transmitting synchronizing signals that correspond to the one content from among the plurality of contents.

The controlling method may additionally include receiving a user's voice collected at the glasses, transmitting screen telephony images generated by photographing a user at the glasses and a user's voice received from the glasses to the another display apparatus, and receiving from the another display apparatus the screen telephony images generated at the another display apparatus and the user's voice collected at the another display apparatus.

The controlling method may additionally include overlapping and displaying on each of the plurality of contents a user interface (UI) screen asking whether to connect screen telephony image, in response to receiving a request for connecting screen telephony from the another display apparatus.

The displaying may include displaying the screen telephony images received from the another display apparatus at a display timing of contents synchronized with the glasses so as to alternately display the one contents of the plurality of content and the screen telephony images received from the another display apparatus, in response to receiving a command to connect screen telephony from the glasses.

The displaying may include overlapping and displaying the screen telephony images received from the another display apparatus at a display timing of the one content and at a display timing of the other contents from among the plurality of contents, in response to receiving a command to connect screen telephony from the glasses.

The transmitting may include transmitting the synchronizing signals to the glasses by using a Bluetooth communication method.

According to an aspect of another exemplary embodiment, there is provided a controlling method of glasses, the controlling method including receiving a user manipulation to perform screen telephony with another display apparatus, transmitting a command to connect screen telephony to a display apparatus and receiving a user's voice collected at the another display apparatus from the display apparatus, in response to receiving the user manipulation, and outputting the received user's voice.

The controlling method may additionally include receiving synchronizing signals corresponding to one content from among the plurality of contents.

The display apparatus may display the screen telephony images received from the another display apparatus at a display timing of the contents synchronized with the glasses, in response to receiving a command to connect screen telephony from the glasses.

The controlling method may additionally include opening the first shutter glasses and the second shutter glasses at display timing of the screen telephony images received from the another display apparatus, based on the synchronizing signals.

The controlling method may additionally include transmitting the collected user's voice to the display apparatus.

BRIEF DESCRIPTION OF THE DRAWINGS

The above and/or other aspects will be more apparent by describing certain exemplary embodiments with reference to the accompanying drawings, in which:

FIG. 14 is a flowchart provided to explain a controlling method of glasses according to an exemplary embodiment.

DETAILED DESCRIPTION OF EXEMPLARY EMBODIMENTS

Figure 1:
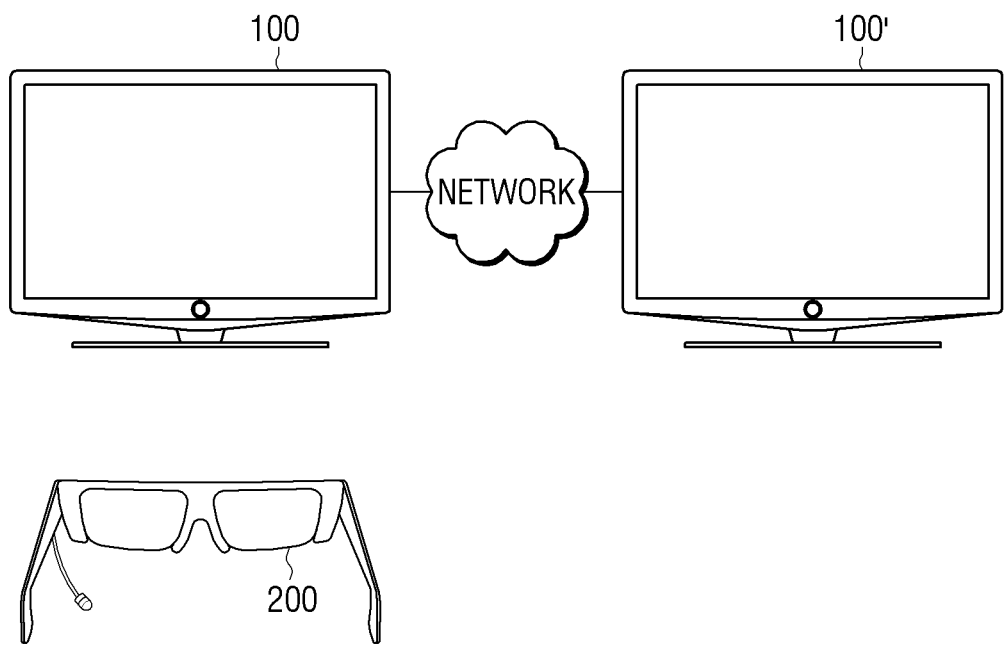
FIGS. 1 to 3 are diagrams of a content providing system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the description with unnecessary detail.

Figure 2:
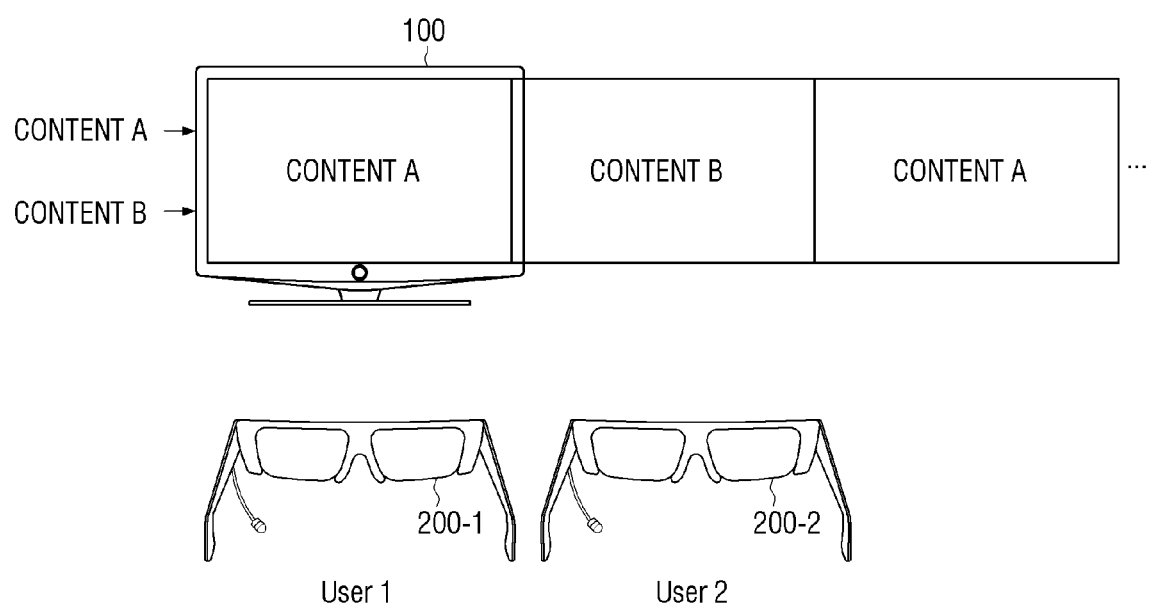
Figure 3:
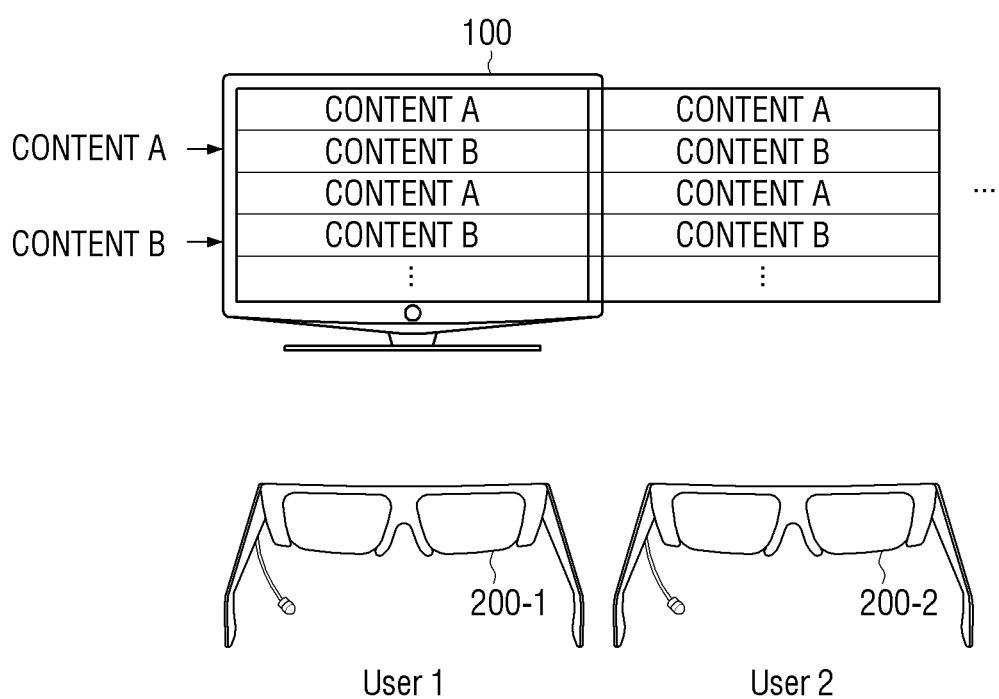

FIGS. 1 to 3 are diagrams of a content providing system according to an exemplary embodiment.

Referring to FIG. 1, the content providing system includes a display apparatus 100 and glasses 200. As illustrated in FIG. 1, the display apparatus 100 may be implemented as a TV, although it is not limited thereto. The display apparatus 100 may be also implemented as various other apparatuses provided with display units such as a mobile phone, a personal digital assistant (PDA), a laptop computer, a monitor, a tablet PC, an electronic book, an electronic frame, or a kiosk.

Specifically, the display apparatus 100 may display a plurality of contents in a multi view mode, and may provide different contents to users wearing different glasses 200.

The 'multi view mode' as used herein refers to a mode which can provide different contents to different users. To implement such multi view mode, the display apparatus 100 and the glasses 200 may be implemented in various methods.

Further explanation will follow by referring to FIGS. 2 and 3. Note that because FIGS. 2 and 3 are illustrated to explain an operation method implementing multi view mode, only the display apparatus 100 and the glasses 200-1, 200-2 are illustrated.

First, referring to FIG. 2, the display apparatus 100 may alternately display a plurality of contents (Contents A, B), generate synchronizing signals to synchronize the glasses 200-1, 200-2 corresponding to respective contents, and transmit the synchronizing signals to the glasses 200-1, 200-2.

In this case, the glasses 200-1, 200-2 may be implemented as active shutter type glasses.

When one Content A displays by synchronizing signals, glasses 200-1 of User 1 may operate, opening both the left shutter glass and right shutter glass, and when another Content B displays, glasses 200-1 may operate by closing both the left shutter glass and right shutter glass. Likewise, when another Content B displays by synchronizing signals, glasses 200-2 of User 2 may operate by opening both the left shutter glass and right shutter glass, and when another Content A displays, glasses 200-2 may operate by closing both the left shutter glass and right shutter glass.

Thus, User 1 wearing glasses 200-1 can watch only the Content A synchronized with glasses 200-1 among alternately displayed plural Contents A, B, and User 2 wearing glasses 200-2 can watch only the Content B synchronized with glasses 200-2 among alternately displayed plural Contents A, B.

Meanwhile, referring to FIG. 3, the display apparatus 100 may display alternately a plurality of contents (Contents A, B) on a line basis. Specifically, the display apparatus 100 displays Content A of plural contents on first horizontal pixel lines, displays Content B on second horizontal pixel lines, and uses a patterned retarder so that Content A and Content B have different polarizations. The first horizontal pixel lines and the second horizontal pixel lines may be alternately arranged.

In this case, glasses 200-1 and glasses 200-2 may be implemented as polarized type (or passive polarized type) glasses.

Specifically, glasses 200-1 may be implemented as a lens for projecting a polarization direction of an image outputted from one horizontal pixel line of horizontal pixel lines in the display apparatus 100, and glasses 200-2 may be implemented as a lens for projecting another polarization direction of an image outputted from another horizontal pixel line.

Thus, User 1 wearing glasses 200-1 may watch only the Content A having the same polarization direction as the glasses 200-1 from among the plurality of Contents A, B which are alternately displayed on a line basis, and User 2 wearing glasses 200-2 may watch only the Content B having the same polarization direction as the glasses 200-2 from among a plurality of Contents A, B which are alternately displayed on a line basis.

Thus, 'outputting contents' in multi view mode may indicate displaying alternately image frames of the respective contents on a time basis or on a line basis.

Multi view mode may be implemented in various methods according to the above exemplary embodiment.

Meanwhile, although FIGS. 2 and 3 illustrate that the display apparatus 100 provides multi view mode through two glasses, i.e., glasses 200-1 and glasses 200-2, this is merely one example. Accordingly, the multi view mode may be provided through three or more glasses. In other words, the display apparatus 100 may transmit synchronizing signals to synchronize open or close timing of the glasses at a display timing of respective contents, and thus may implement multi view mode with more than three glasses. Further, multi view mode may be implemented by alternately displaying a plurality of contents respectively and having a polarization direction of the respective contents conform to the polarization direction of three or more glasses.

Meanwhile, referring back to FIG. 1, the display apparatus 100 may transmit and receive screen telephony images and the user's voice to and from another display apparatus 100' through a network 10 and perform screen telephony.

In the above case, the network 10 may transmit and receive data for screen telephony between the display apparatus 100 and another display apparatus 100' by using Voice Over Broadband (VoBB), or by using a legacy service. Specifically, VoBB may include Voice over DSL (VoDSL), Voice over Internet Protocol (VoIP), Fixed Wireless Access (FWA), Fiber to the Home (FTTH) or Voice over ATM (VoATM). Meanwhile, a legacy service may include an Integrated Service Digital Network (ISDN), a Plain Old Telephone Service (POTS), a cellular or 3G service.

Thus, the display apparatus 100 and another display apparatus 100' may transmit and receive screen telephony images and the user's voice by using a wireless network, a telephone network, a data network such as the Internet, a cable modem system, or a cellular network.

For instance, if the display apparatus 100 and another display apparatus 100' perform screen telephony through the Internet, the Internet may have screen telephony servers of providers of screen telephony. For example, if the display apparatus 100 and another display apparatus 100' use screen telephony with an Internet telephone, the Internet has the servers of providers of internet telephone service by using VoIP or a Multimedia over Internet Protocol (MoIP).

Through the servers of telephone service providers, data may be transmitted and received for screen telephony between the display apparatus 100 and another display apparatus 100'. Further, the display apparatus 100 and another display apparatus 100' may be allocated with telephone numbers through the servers of telephone service providers.

Meanwhile, the display apparatus 100 and another display apparatus 100' may transmit and receive screen telephony images and the user's voice according to a standard established between the two. For example, protocols such as the H.261 standard for coding screen telephony image, the H.221 standard for communicating screen telephony images and the user's voice, and the H.242 standard for setting and lifting requests may be used. More specifically, regarding the screen communication system using an Internet network, protocols implemented in screen telephony standards such as H.323, H.263, and H.264 for coding images and G723.1, G711, and G.729 for coding voices may be used.

However, the communication service for screen telephony operation is not limited to the examples explained above. For example, besides the above standards, the display apparatus 100 and another display apparatus 100' may use standards such as SIP or RTP/RTCP, or other known communication services for screen telephony.

Meanwhile, if the display apparatus 100 operates in multi view mode, screen telephony may be provided to a user according to the following method.

First, referring to FIG. 2, if glasses 200-1 and glasses 200-2 are implemented as active shutter type glasses, the display apparatus 100 may alternately display content and screen telephony images.

Specifically, the display apparatus 100 may display screen telephony images received from another display apparatus 100' at a display timing of contents synchronized with glasses 200-1, i.e., Content A. Thus, User 1 wearing glasses 200-1 may view screen telephony images synchronized with glasses 200-1 among alternately displayed screen telephony images and Content B. Likewise, the display apparatus 100 may display screen telephony images received from another display apparatus 100' at a display timing of contents synchronized with glasses 200-2, i.e., Content B, and User 2 may view screen telephony image.

Meanwhile, referring to FIG. 3, if glasses 200-1 and glasses 200-2 are implemented as polarized type glasses, the display apparatus 100 may alternately display content and screen telephony images on a line basis.

Specifically, the display apparatus 100 may display screen telephony image on first horizontal pixel line having the same polarization direction as glasses 200-1, and display Content B on second horizontal pixel line having the same polarization direction as glasses 200-2. Thus, User 1 wearing glasses 200-1 may view only the screen telephony images. Further, the display apparatus 100 may display screen telephony images on second horizontal pixel line having the same polarization direction as glasses 200-2, and Content A on first horizontal pixel line having the same polarization direction as glasses 200-1. Thus, User 2 wearing glasses 200-2 may view only the screen telephony images.

Meanwhile, in the above exemplary embodiment, the contents may be 3D contents having a left-eye image and a right-eye image. The '3D contents' used herein indicates contents using a perspective image which expresses a same object with several different viewpoints and provides a sense of depth to a user.

To use a method for providing multi view mode by using synchronizing signals, 3D contents may be provided in multi view mode. In this case, the display apparatus 100 may alternately display a plurality of 3D contents (Contents A, B), and may also alternately display a left-eye image and a right-eye image.

For example, the display apparatus 100 may alternately display a left-eye image and a right-eye mage (AL, AR) of 3D Content A and alternately display a left-eye image and a right-eye image (BL, BR) of 3D Content B. In this case, according to synchronizing signals, glasses 200-1 may open a left-eye glass and a right-eye glass at the time of displaying the left-eye image and the right-eye image (AL, AR) of Content A, and glasses 200-2 may open a left-eye glass and a right-eye glass at the time of displaying the left-eye image and the right-eye image (BL, BR) of Content B according to synchronizing signals.

Thus, User 1 wearing glasses 200-1 views only the 3D Content A, and User 2 wearing glasses 200-2 views only the 3D Content B.

Further, although the above exemplary embodiment describes displaying 2D or 3D contents in the display apparatus 100, the above method may be uniformly applied when in displaying 2D and 3D contents simultaneously. That is, one user may view 3D content and another may view 2D content simultaneously.

Figure 4:
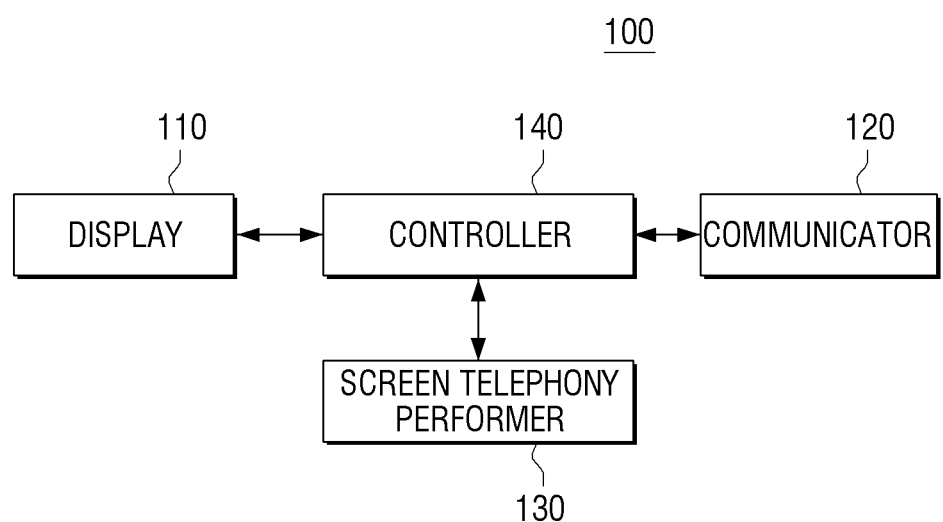
FIG. 4 is a bock diagram of a display apparatus according to an exemplary embodiment.

FIG. 4 is a block diagram of a display apparatus according to an exemplary embodiment. Referring to FIG. 4, the display apparatus 100 includes a display 110, a communicator 120, a screen telephony performer 130, and a controller 140.

As described above, the display apparatus 100, along with the glasses 200, may provide a multi view mode.

The display 110 displays each of a plurality of contents.

Specifically, the display 110 may alternately display at least one of image frames in respective contents. For example, the display 110 may form and display an image so that at least one image frames of content 1, content 2, ..., content n content are alternately arranged in an order such as: one image frame of content 1, one image frame of content 2, ..., one image frame of content n.

In this process, contents may include at least one of 2D contents or 3D contents.

Regarding 2D contents, the display 110 forms and displays an image so that image frames of each content are alternately arranged in an order such as an image frame of 2D content 1, an image frame of 2D content 2, ..., an image frame of 2D content n. Regarding 3D contents, the display 110 may form and display an image so that left-eye image frames and right-eye image frames of each 3D content are alternately arranged in an order such as left-eye image frame of 3D content 1, right-eye image frame of 3D content 1, left-eye image frame of 3D content 2, right-eye image frame of 3D content 2, ..., left-eye image frame of 3D content n, right-eye image frame of 3D content n. Further, the display 110 may combine and display 2D content and 3D contents such as an image frame of 2D content 1, an image frame of 2D content 2, left-eye image frame of 3D content 3, right-eye image frame of 3D content 3 . . . .

The display 110 may alternately display image frames of respective contents on a line basis. For example, the display 110 forms and displays one image frame having odd series of horizontal pixel lines in content 1 image frames and even series of horizontal pixel lines of content 2 image frames. In other words, the display 110 forms and displays an image frame so that at least one image frame in each content are alternately arranged on a line basis.

In this case, the display 110 may have a patterned retarder mounted thereon and provide an output image of each line alternately to have different polarized light on a line basis. For example, images output from an odd series of horizontal pixel lines and images output from an even series of horizontal pixel lines have different polarized lights.

The communicator 120 communicates with the glasses. The communicator 120 may also transmit audio corresponding to respective contents to the glasses. In other words, the communicator 120 may transmit audio of each content alternately displayed on the display 110.

For example, referring to FIGS. 2 and 3, the communicator 120 may transmit audio of Content A to glasses 200-1 and audio of Content B to glasses 200-2.

Further, the communicator 120 may transmit the user's voice received from another display apparatus 100' to the glasses. Specifically, the communicator 120 may transmit the user's voice received from another display apparatus 100' to the glasses transmitting a command to connect screen telephony.

The communicator 120 also receives the user's voice collected in the glasses. Specifically, the communicator 120 may receive the user's voice collected by the glasses transmitting a command to connect screen telephony from the glasses.

For example, referring to FIGS. 2 and 3, the communicator 120 may transmit the user's voice received from another display apparatus 100' to the glasses transmitting a command to connect screen telephony among glasses 200-1 and glasses 200-2. The communicator 120 may receive the user's voice collected by corresponding glasses transmitting a command to connect screen telephony among glasses 200-1 and glasses 200-2.

The communicator 120 communicates with the glasses and transmits synchronizing signals corresponding to one of a plurality of contents. In other words, if the glasses are implemented as active shutter type glasses like in FIG. 2, the communicator 120 may transmit synchronizing signals so as to synchronize the respective glasses at the display timing of contents alternately displayed on the display 110 to the glasses, respectively.

For example, if two contents are alternately displayed as illustrated in FIG. 2, the communicator 120 may transmit synchronizing signals to synchronize glasses 200-1 at the display timing of Content A to glasses 200-1, and transmit synchronizing signals to synchronize glasses 200-2 at the display timing of Content B to glasses 200-2.

Glasses may open left-eye shutter glass and right-eye shutter glass at the display timing of contents synchronized with the glasses itself among the content alternately displayed on the display 110 and may close left-eye shutter glass and right-eye shutter glass at the display timing of another contents. Thus, a user wearing glasses may view contents only synchronized with the glasses that he uses among the alternately displayed plural contents.

The communicator 120 may communicates with glasses according to various wireless communication methods. For example, the communicator 120 may include a Bluetooth communication module. In this case, the communicator 120 may transmit and receive various data in transmission packet format defined in the Bluetooth communication protocol with glasses. Further, the communicator 120 may perform communications with a plurality of glasses through one Bluetooth communication module. The communicator 120 may also have a plurality of Bluetooth communication modules and perform communication with each of the plurality of glasses by using of the various Bluetooth communication modules.

In the above process, the communicator 120 may perform communication with glasses by using a frequency bandwidth defined in the Bluetooth communication protocol such as the Industrial Scientific Medical (ISM) of 2.4 GHz bandwidth.

The above exemplary embodiment describes that the display apparatus 100 communicates with glasses according to Bluetooth communication method, but it is not limited thereto. In addition to a Bluetooth communication method, communication methods such as infrared communication, Zigbee, and Radio Frequency (RF) communication may be used. Further, communication may be performed according to various wireless communication methods that can form communication channels within a near field range and transmit and receive signals.

For example, the communicator 120 may transmit synchronizing signals to the glasses by using a Bluetooth communication method, and transmit and receive the user's voice with glasses through another RF channel. To process the above, the communicator 120 may have mounted thereon a RF communication module. For example, the communicator 120 may transmit and receive the user's voice with glasses 200-1 through a first frequency bandwidth among frequency bandwidths used in RF communication, and transmit and receive the user's voice with glasses 200-2 through preset second frequency bandwidth.

The screen telephony performer 130 performs screen telephony with another display apparatus 100'. Specifically, the screen telephony performer 130 may photograph a user, generate a screen telephony image from the photograph, and transmit the generated screen telephony image and the user's voice received from glasses to another display apparatus 100'. Further, the screen telephony performer 130 may receive a screen telephony image generated in another display apparatus 100' and the user's voice collected in another display apparatus 100' from another display apparatus 100'. To process the above, the screen telephony performer 130 may communicate with another display apparatus 100' through network 10 (see FIG. 1).

The controller 140 may include one or more microprocessors and one or more memories and controls overall operations of the display apparatus 100. Specifically, the controller 140 may control the communicator 120 to communicate with the glasses. In the following, it is assumed that the communicator 120 uses a Bluetooth communication module and communicates with Bluetooth communication module mounted on the glasses according to the Bluetooth communication protocol for convenience of explanation. However, as discussed above, other communication modules and protocols may be used.

Specifically, the glasses broadcast an inquiry message to perform pairing and search for the display apparatus 100 within a Bluetooth communication available range. When the controller 140 receives the inquiry message, the controller 140 controls the communicator 120 to transmit an extended inquiry response (EIR) to the glasses. In this process, EIR may include a Bluetooth device address, device names, a class of device (COD) and clock information.

Meanwhile, the glasses that receive the EIR transmit a transmission packet including a Bluetooth address and device type to the display apparatus 100. When the controller 140 receives the corresponding transmission packet through the communicator 120, the controller 140 controls the communicator 120 to transmit and receive a PIN code with the glasses, and performs pairing with the glasses. The controller 140 automatically inputs the PIN code even though a user does not input the PIN code and registers the display apparatus 100, and thus, performs pairing automatically. However, the exemplary embodiment is not limited to the above. Accordingly, a user may alternatively input a PIN code of a display apparatus and perform pairing using the input PIN code.

According to the above method, the controller 140 may control the communicator 120 to be ready for communicating with the glasses. However, this is merely one exemplary embodiment; the controller 140 may control the communicator 120 to be ready for communicating with glasses according to various methods used in the Bluetooth communication protocol.

The controller 140 may control the communicator 120 to transmit and receive various data with the glasses. For example, referring to FIG. 2, it is assumed that the display apparatus 100 alternately displays Content A and Content B, and the communicator 120 communicates with glasses 200-1 and glasses 200-2 according to the Bluetooth communication protocol.

In this case, the controller 140 may control the communicator 120 to use a first frequency bandwidth preset among frequency bandwidths defined in the Bluetooth communication protocol and to transmit synchronizing signals and audio corresponding to Content A to glasses 200-1. Further, the controller 140 may control the communicator 120 to use a second frequency bandwidth preset among frequency bandwidths defined in the Bluetooth communication protocol, and to transmit synchronizing signals and audio corresponding to Content B to glasses 200-2.

Synchronizing signals transmitted to glasses 200-1 are signals to synchronize glasses 200-1 at a display timing of Content A from among a plurality of contents displayed on the display 110. Synchronizing signals transmitted to glasses 200-2 are signals to synchronize glasses 200-2 at a display timing of Content B. Further, audio transmitted to glasses 200-1 may be audio corresponding to Content A, and audio transmitted to glasses 200-2 may be audio corresponding to Content B.

For another example, referring to FIG. 3; it is assumed that the display apparatus 100 alternately displays Content A and Content B on a line basis, and the communicator 120 communicates with glasses 200-1 and glasses 200-2 according to the Bluetooth communication protocol.

In this case, the controller 140 may control the communicator 120 to use a first frequency bandwidth preset among frequency bandwidths defined in the Bluetooth communication protocol, and to transmit audio corresponding to Content A to glasses 200-1. Further, the controller 140 may control the communicator 120 to use a second frequency bandwidth preset among frequency bandwidths defined in the Bluetooth communication protocol and to transmit audio corresponding to Content B to glasses 200-2. In this case, audio transmitted to glasses 200-1 may be audio corresponding to Content A, and audio transmitted to glasses 200-2 may be audio corresponding to Content B.

However, the above is merely one exemplary embodiment. Accordingly, a method for transmitting synchronizing signals and audio to each pair of glasses may be implemented using various exemplary embodiments.

When performing screen telephony with another display apparatus 100', the controller 140 may control the communicator 120 to transmit the user's voice received from another display apparatus 100' to the glasses. In other words, the controller 140 may control transmitting the user's voice received from another display apparatus 100' instead of content audio corresponding to the glasses.

Specifically, when receiving a screen telephony request transmitted from another display apparatus 100' through the screen telephony performer 130, the controller 140 may control the communicator 120 to transmit the user's voice received from another display apparatus 100' to the glasses. The controller 140 may control transmitting the user's voice transmitted from another display apparatus 100' to the glasses transmitting a command to connect screen telephony. In this case, the controller 140 may control to stop transmission of content audio to the glasses transmitting a command to connect screen telephony.

For example, when receiving a command to connect screen telephony from glasses 200-1 in FIGS. 2 and 3, the controller 140 may control the communicator 120 to transmit the user's voice received from another display apparatus 100' to the glasses 200-1. Further, when receiving a command to connect screen telephony from glasses 200-2 in FIGS. 2 and 3, the controller 140 may control the communicator 120 to transmit the user's voice received from another display apparatus 100' to the glasses 200-2.

Further, the controller 140 may control the display 110 to display one of screen telephony images received from another display apparatus 100' and plural contents in multi view mode.

For example, it is assumed that glasses are implemented as active shutter type and multi view mode is provided in FIG. 2.

Specifically, when receiving a command to connect screen telephony from glasses, the controller 140 may control displaying screen telephony image received from another display apparatus 100' at a display timing of contents synchronized with the glasses so as to alternately display one contents of plural content and screen telephony images received from another display apparatus 100'.

Thus, the controller 140 may control displaying screen telephony images received from another display apparatus 100' instead of contents synchronized with the glasses transmitting a command to connect screen telephony, and a user wearing the glasses transmitting a command to connect screen telephony may view screen telephony images.

For example, it is assumed that glasses 200-1 transmits a command to connect screen telephony in FIG. 2. In this case, the controller 140 may stop displaying Content A synchronized with glasses 200-1 among a plurality of contents alternately output through the display 110, and may consecutively display each frame of the screen telephony images received from another display apparatus 100' at a display timing of Content A. Thus, the display 110 alternately displays screen telephony images and Content B synchronized with glasses 200-2. For example, the display 110 displays images according to the following order: image frame 1 of the screen telephony images, image frame 1 of Content B, image frame 2 of the screen telephony images, image frame 2 of Content B . . . . Thus, User 1 wearing glasses 200-1 views only the screen telephony images, and User 2 wearing glasses 200-2 views only Content B.

Likewise, when transmitting a command to connect screen telephony to glasses 200-2, the controller 140 may control alternately outputting Content A synchronized with glasses 200-1 and screen telephony images. For example, the display 110 displays an image according to the following order: image frame 1 of Content A, image frame 1 of the screen telephony images, image frame 2 of Content A, image frame 2 of the screen telephony images . . . . Thus, User 1 wearing glasses 200-1 views only Content A, and User 2 wearing glasses 200-2 views only the screen telephony images.

Further, when a command to connect screen telephony is received from glasses, the controller 140 may control overlapping and displaying screen telephony images received from another display apparatus 100' at a display timing of one and another content among plural contents. In other words, when a command to connect screen telephony is received from glasses synchronized with at least content 2 in the plural content alternately being output through the display 110, the controller 140 may overlap and display screen telephony images at a display timing of the corresponding contents, respectively.

For example, it is assumed that glasses 200-1 and glasses 200-2 transmit a command to connect screen telephony to the display apparatus 100 in FIG. 2. In this case, the controller 140 may stop displaying Content A and Content B alternately being output through the display 110, and overlap and display screen telephony images at the display timings of the respective contents. Specifically, the controller 140 may control displaying an image frame of the screen telephony images at a display timing of an image frame of Content A synchronized with glasses 200-1, and displaying the same image frame at a display timing of an image frame of Content B synchronized with glasses 200-2. In other words, the controller 140 may control displaying according to the following order: image frame 1 of the screen telephony images, image frame 1 of the screen telephony images, image frame 2 of the screen telephony images, image frame 2 of the screen telephony images . . . . Thus, both the User 1 wearing glasses 200-1 and User 2 wearing glasses 200-2 view the screen telephony images.

Further, when a request to connect screen telephony is received from another display apparatus 100', the controller 140 may control overlapping and displaying a UI screen asking whether to connect screen telephony with each of plural contents. A specific example of the UI screen will be further explained below.

The controller 140 may control overlapping and displaying the UI screen with an image frame of each content alternately displayed on the display 110. The controller 140 may control displaying according to the following order: image frame 1 of content 1+UI screen, image frame 1 of content 2+UI screen, image frame 2 of content 1+UI screen, image frame 2 of content 2+UI screen . . . . Thus, users wearing glasses may check whether another display apparatus 100' is requesting to connect screen telephony through the UI screen.

Further, when receiving a command to connect screen telephony or a command to reject connection to screen telephony through the communicator 120 from the glasses, the controller 140 may stop displaying the corresponding UI screen.

Specifically, when receiving a command to connect screen telephony from glasses, the controller 140 may stop displaying the corresponding UI screen, and display screen telephony images received from another display apparatus 100' instead of contents synchronized with the glasses transmitting a command to connect screen telephony. Further, when receiving a command to reject connection to screen telephony from the glasses, the controller 140 may stop displaying the corresponding UI screen, and display previously displayed contents. In this case, the controller 140 may stop displaying UI screen at a display timing of contents synchronized with the glasses transmitting a command to reject connection to screen telephony, and may overlap and display the UI screen with content at a display timing of contents synchronized with glasses which do not transmit a command to reject connection to screen telephony. In other words, if one pair of glasses rejects screen telephony, that pair of glasses may return to displaying previously displayed contents, and instead the UI display may be overlapped and displayed on another pair of glasses for another user to take the call.

Meanwhile, the above exemplary embodiment describes that displaying UI screen stops if a command to connect screen telephony or a command to reject the connection to screen telephony is received from the glasses, but the controller is not limited thereto. The controller 140 may stop displaying corresponding UI screen after predetermined time from the time of displaying UI screen from a time at which a command is not received to connect screen telephony or a command to reject connection to screen telephony is received.

Further, the above exemplary embodiment describes that the glasses are implemented as active shutter type glasses, but the glasses are not limited thereto. Even if the glasses are implemented as polarized type glasses, the controller 140 may control the display 110 to display screen telephony images received from another display apparatus 100' and one of plural contents in multi view mode.

Specifically, when receiving a command to connect screen telephony from the glasses, the controller 140 may control alternately displaying one of plural content and screen telephony image received from another display apparatus 100' on a line basis.

Thus, the controller 140 may display screen telephony images on corresponding horizontal lines instead of contents having the same polarization direction as the glasses transmitting a command to connect screen telephony.

For example, it is assumed that glasses 200-1 transmits a command to connect screen telephony in FIG. 3. In this case, the controller 140 may stop displaying Content A having the same polarization direction as glasses 200-1 and display screen telephony images on corresponding line. In other words, the controller 140 may control forming one image frame including odd horizontal pixel lines of an image frame of the screen telephony images and even horizontal pixel lines of a Content B image frame, and displaying the formed image frame. Thereby, User 1 wearing glasses 200-1 views screen telephony image only and User 2 wearing glasses 200-2 views Content B only.

Likewise, when glasses 200-2 transmit a command to connect screen telephony, the controller 140 may stop displaying Content B having the same polarization direction as glasses 200-2, and display an image frame of the screen telephony images on a corresponding line. The controller 140 may control forming one image frame including odd horizontal pixel lines of a Content A image frame and even horizontal pixel lines of an image frame of the screen telephony images, and displaying the formed image frame. Therefore, User 2 wearing glasses 200-2 views screen telephony images only and User 1 wearing glasses 200-1 views Content A only.

Further, when receiving a command to connect screen telephony from every one of the glasses, the controller 140 may control so that displaying a plurality of contents can stop and screen telephony image can be displayed. For example, it is assumed that glasses 200-1 and glasses 200-2 both transmit a command to connect screen telephony to the display apparatus 100 in FIG. 3. In this case, the controller 140 may stop displaying Content A and Content B alternately output on a line basis through the display 110, and overlap and display screen telephony image. Thereby, User 1 wearing glasses 200-1 and User 2 wearing glasses 200-2 both view the screen telephony images.

Further, when receiving a request to connect screen telephony from another display apparatus 100', the controller 140 may control overlapping and displaying UI screen asking whether to connect screen telephony on each of plural contents. Specifically, the controller 140 may overlap the UI screen with an image frame of respective contents, and alternately display respective contents on a line basis. The controller 140 may form one image frame including odd horizontal pixel lines of a content 1 image frame overlapped with the UI screen and even horizontal pixel lines of a content 2 image frame overlapped with the UI screen, and display the formed image frame. Thus, users wearing glasses can check whether another display apparatus 100' requests connecting screen telephony through UI screen.

Further, when receiving a command to connect screen telephony or a command to reject connection to screen telephony from glasses through the communicator 120, the controller 140 may stop displaying corresponding UI screen.

Specifically, when receiving a command to connect screen telephony from glasses, the controller 140 may stop displaying the corresponding UI screen, and display screen telephony images received from another display apparatus 100' on lines having the same polarization direction as glasses transmitting a command to connect screen telephony.

Further, when receiving a command to reject connection to screen telephony from glasses, the controller 140 may stop displaying the corresponding UI screen, and display contents which was displayed before. In this case, the controller 140 may stop displaying the UI screen displayed on lines having the same polarization direction as the glasses transmitting a command to reject connection to screen telephony, and overlap and display the UI screen with contents on lines having the same polarization direction as glasses which do not transmit a command to reject connection to screen telephony.

Figure 5:
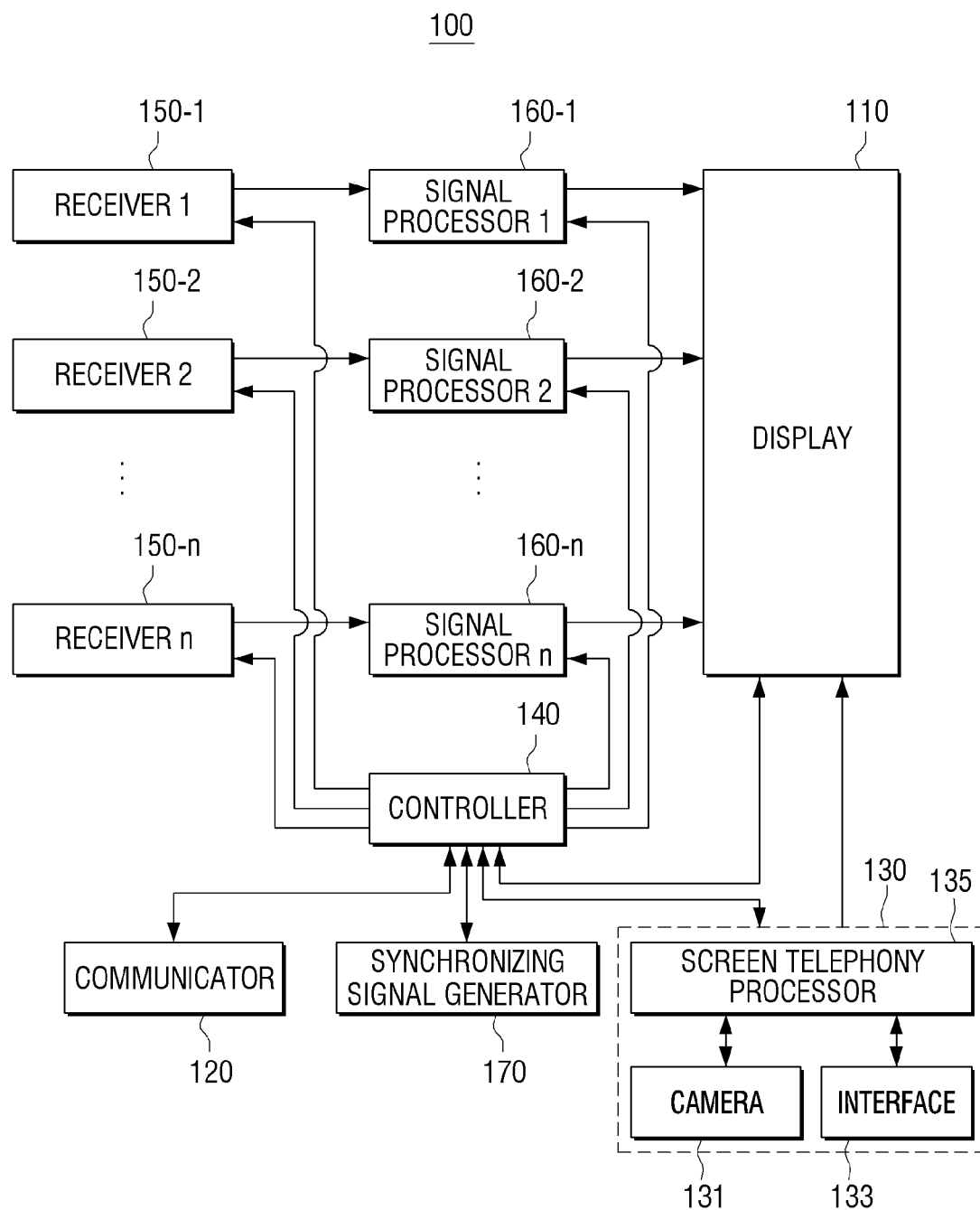
FIG. 5 is a detailed block diagram of a display apparatus according to an exemplary embodiment.

FIG. 5 is a block diagram provided to explain a detailed constitution of a display apparatus according to an exemplary embodiment. Referring to FIG. 5, the display apparatus 100 includes a display 110, a communicator 120, a screen telephony performer 130, a controller 140, a plurality of receivers 150-1, 150-2, . . . , 150-n, a plurality of signal processors 160-1, 160-2, . . . , 160-n, and a synchronizing signal generator 170. When explaining FIG. 5, units having same drawing reference numerals as in FIG. 2 will not be further described.

The screen telephony performer 130 includes a camera 131, an interface 133, and a screen telephony processor 135.

The camera 131 photographs a user and generates screen telephony images. For example, the camera 131 may be implemented as a video camera, and photograph a user standing in front of the display apparatus 100 and generate screen telephony images. In this case, the video camera may be included within the display apparatus 100, or may be connected externally. Further, the video camera may be covered inside and may pop out when in use.

Meanwhile, the photographed images may be delivered to the screen telephony processor 135, and processed in a format that can be displayed by the display 110 or a format that can be transmitted to another display apparatus 100'.

The interface 133 may transmit photographed screen telephony images and the user's voice received from glasses 200-1 and/or glasses 200-2 to another display apparatus 100', and receive screen telephony images generated in another display apparatus 100' and the user's voice collected by another display apparatus 100' from another display apparatus 100'.

To process the above, the interface 133 may use wired/wireless LAN, WAN, Ethernet and WiFi, and perform communication with another display apparatus 100'. The interface 133 may include a chip or external input port corresponding to each communication method.

The screen telephony processor 135 may include at least one microprocessor or at least one microcontroller, and is formed to process screen telephony data, i.e., screen telephony image and the user's voice.

Specifically, the screen telephony processor 135 processes screen telephony images generated in the camera 131 and a user's voice received from the communicator 120 in a format that can be transmitted to another display apparatus 100', and delivers the images and the user's voice to the interface 133. For example, the screen telephony processor 135 may encode screen telephony image delivered from the camera 131 according to the H.323, H.263, and/or H.264 standards and the user's voice received from the glasses 200 according to the G.723.1, G.711 and/or G.729 standards. Further, the screen telephony processor 135 may deliver corresponding data to the interface 133 in order to transmit encoded screen telephony data to another display apparatus 100'.

The screen telephony processor 135 may decode screen telephony images and the user's voice received from another display apparatus 100'. For example, the screen telephony processor 135 decodes encoded screen telephony data according to the H.323, H.263 and H.264 standards, and the encoded user's voice according to the G.723.1, G.711 and G.729 standards.

However, the above is merely one exemplary embodiment. Accordingly, screen telephony image and the voices of users may be processed according to various methods.

The screen telephony processor 135 may include a scaler (not illustrated) to perform up or down scaling to decode screen telephony images to a screen size of the display 110, and a frame rate converter (not illustrated) to convert the frame rate of the screen telephony images. Besides, the screen telephony processor 135 may include a data format converter (not illustrate) to convert screen telephony images into a data format corresponding to a frame rate used by the frame rate converter (not illustrated). For example, if input screen telephony images are in a top-to-bottom format while a frame rate converter (not illustrated) processes frames in side-by-side format, the data format converter (not illustrated) may connect each image frame of the screen telephony images on a horizontal direction and convert to a side-by-side format.

The frame rate converter (not illustrated) converts the frame rate of the screen telephony images by referring to an output rate of the display apparatus 100. For example, regarding National Television System Committee (NTSC) method, a frame rate that can be displayed on the display apparatus 100 may be 60 frames per second. Thus, the frame rate converter (not illustrated) converts the frame rate of respective contents to 60 Hz.

Meanwhile, the screen telephony processor 135 may control delivering of a user's voice to the communicator 120, and transmitting of the user's voice received from another display apparatus 100' to glasses through the communicator 120. In this case, the screen telephony processor 135 may decode the user's voice received from another display apparatus 100' and deliver the decoded voice signal to the communicator 120.

A plurality of receivers 150-1, 150-2, . . . , 150-n receive different contents of a plurality of different contents. Specifically, each of the receivers 150-1, 150-2, . . . , 150-n receives contents from broadcasting station transmitting broadcasting program content by using a broadcasting network or from web servers transmitting contents files by using the Internet. Further, the receivers may receive contents from various types of recording medium playing apparatuses installed within the display apparatus 100 or connected to the display apparatus 100. A 'recording medium playing apparatus' indicates an apparatus that plays contents stored in various types of recording medium such as CD, DVD, hard disk, Blu-ray disk, memory card, and USB memory.

Regarding an exemplary embodiment of receiving contents from broadcasting stations, each of the plurality of the receivers 150-1, 150-2, . . . , 150-n may include a tuner (not illustrated), a demodulator (not illustrated), and a filter (not illustrated). Meanwhile, regarding an exemplary embodiment of receiving contents from sources such as web servers, the plurality of the receivers 150-1, 150-2, . . . , 150-n may be implemented as network interface cards (not illustrated). Further, regarding an exemplary embodiment of receiving contents from various types of recording medium playing apparatuses, the plurality of the receivers 150-1, 150-2, . . . , 150-$n$ may be implemented as interfaces (not illustrated) connected to recording medium playing apparatuses. Thus, the plurality of the receivers 150-1, 150-2, . . . , 150-$n$ may be implemented as various types of receivers.

Further, a plurality of the receivers 150-1, 150-2, . . . , 150-$n$ may receive contents from different types of sources, and need not receive contents from a same type of source. For example, receiver 150-1 may be implemented to include a tuner, a demodulator, and a filter, and receiver 150-2 may be implemented as a network interface card.

The plurality of the signal processors 160-1, 160-2, . . . , 160-$n$ may process respective received contents from the plurality of the receivers 150-1, 150-2, . . . , 150-$n$ and form image frames. Further explanations follow referring to FIG. 6.

Figure 6:
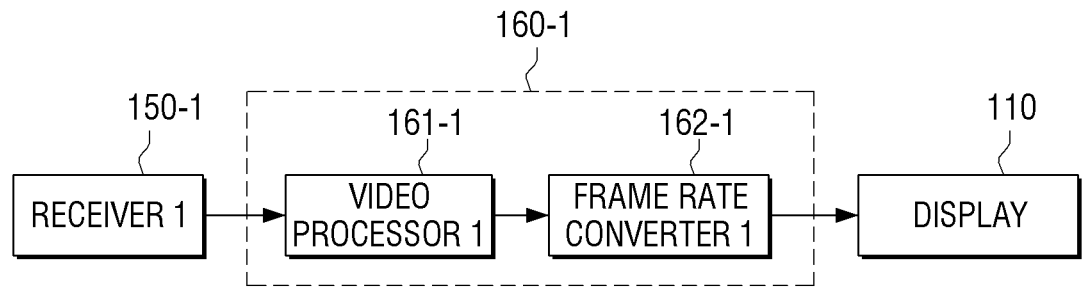
FIG. 6 is a block diagram provided to explain a specific constitution of a signal processor according to an exemplary embodiment.

FIG. 6 is a block diagram provided to explain a detailed constitution of a signal processor according to an exemplary embodiment. Referring to FIG. 6, signal processor 1 160-1 includes video processor 1 161-1 and frame rate converter 1 162-1. Although FIG. 6 illustrates one signal processor 1 160-1, other signal processors 160-2, . . . , 160-$n$ may be implemented as same constitution in FIG. 6.

Video processor 1 161-1 performs signal processing of video data included in contents received from receiver 1 150-1. Specifically, video processor 1 161-1 may include a decoder (not illustrated) decoding video data, and a scaler (not illustrated) performing up or down scaling to screen size of the display 110.

Video processor 1 161-1 may convert video data to a data format corresponding to a frame rate handled by the frame rate converter 1 162-1. Specifically, if video data is input in a top-to-bottom format while frame rate converter 1 162-1 processes frames in a side-by-side format, video processor 1 161-1 may connect image frames of respective contents in a horizontal direction and convert the image frame into side-by-side format.

Frame rate converter 1 162-1 converts a frame rate of contents provided from video processor 1 161-1 by referring to an output rate of the display apparatus 100. For example, regarding the NTSC method, a frame rate that can be displayed in the display apparatus 100 may be 60 frames per second. Therefore, frame rate converter 1 162-1 converts the frame rate of respective contents to 60 Hz.

Although the above exemplary embodiment describes that the screen telephony processor 135 and a plurality of the signal processors 160-1, 160-2, . . . , 160-$n$ process screen telephony images and images constituting contents, the above is merely an example. Thus, through one video processor and one frame rate converter, both the screen telephony images and images constituting contents may be processed.

Referring to FIGS. 5 and 6, the display 110 alternately arranges and displays image frames of respective contents formed by a plurality of the signal processors 160-1, 160-2, . . . , 160-$n$. Specifically, the display 110 multiplexes and displays so that at least one image frame of respective contents provided from a plurality of the signal processors 160-1, 160-2, . . . , 160-$n$ are alternately arranged. Depending on the exemplary embodiment, the display 110 may perform up or down scaling of image frames of respective contents according to a screen size.

For example, the display 110 forms and displays data so that at least one image frame of image frames of content 1, image frames of content 2, . . . , image frames of content n are alternately arranged. In this case, because each content is converted to have 60 per second frame, the display 110 may display image frames of a plurality of contents alternately arranged at an operating frequency of n×60 Hz.

A user may wear glasses interoperating at a display timing of the contents in the display 110 and can view desired contents. For example, the glasses of FIG. 2 may be provided with left-eye shutter glass and right-eye shutter glass. Left-eye shutter glass and right-eye shutter glass alternately opens/closes when viewing 3D contents. However, as described above, if at least one image frame of each content is alternately arranged and displayed, the glasses may open both the left-eye shutter glass and right-eye shutter glass when displaying contents synchronized with the glasses, and close both the left-eye and right-eye shutter glasses when displaying contents unsynchronized with the glasses. Thus, a user can view contents separately from other users.

If the contents is 3D contents, the display 110 may multiplex left-eye and right-eye images included in each 3D contents provided from a plurality of frame rate converters 162-1, 162-2, . . . , 162-$n$ in a preset arrangement format, and alternately arrange with image frames of other contents.

Specifically, the display 110 consecutively arranges and displays a left-eye image of content 1, a right-eye image of content 1, a left-eye image of content 2, a right-eye image of content 2, . . . , a left-eye image of n contents, a right-eye image of n contents. A user can view left-eye and right-eye images of one 3D content through glasses. In this case, because image frames of respective contents are converted to have 60 frames per second, the display 110 may display image frames of each content alternately arranged at operating speed of n×120 Hz.

The display 110 may display screen telephony images processed by the screen telephony processor 135 at a display timing of contents synchronized with the glasses transmitting a command to connect screen telephony.

For example, it is assumed that the display apparatus 100 interoperates with glasses 200-1 and glasses 200-2 in FIG. 2.

In this case, when receiving a command to connect screen telephony from glasses 200-1, the display 110 alternately displays screen telephony images processed in the screen telephony processor 135 and Content B processed in signal processor 2 160-2 instead of Content A processed in signal processor 1 160-1. Thus, the display 110 multiplexes so as to alternately arrange each of image frames constituting screen telephony images and each of image frames constituting Content B. The display 110 may display alternately arranged image frames of screen telephony images and content at an operating speed of 120 Hz.

Similarly, when receiving a command to connect screen telephony from glasses 200-2, the display 110 may alternately display screen telephony images processed in the screen telephony processor 135 and Content A processed in the signal processor 1 160-1 instead of Content B processed in signal processor 2 160-2. In other words, the display 110 multiplexes so as to alternately arrange each of image frames constituting Content A and each of image frames constituting screen telephony images. The display 110 may display alternately arranged image frames of screen telephony images and content at an operating speed of 120 Hz.

When receiving a command to connect screen telephony from glasses 200-1 and glasses 200-2, the display 110 may overlap and display each image frame of screen telephony images processed in the screen telephony processor 135, rather than Content A and Content B processed in signal processor 1 160-1 and signal processor 2 160-2. The display 110 may overlap and arrange each image frame such as an image frame 1 constituting screen telephony image, image frame 1, image frame 2, image frame 2 . . . , and display the arranged image frames at an operating speed of 120 Hz.

The above exemplary embodiment assumes that contents is 3D; however, regarding 2D contents, screen telephony image may be displayed according to the same method.

Regarding 3D contents, when receiving a command to connect screen telephony from one pair of glasses, the display 110 multiplexes so that left-eye and right-eye image frames of screen telephony images can be alternately arranged with image frames of other contents at a display timing of contents synchronized with corresponding glasses. For example, it is assumed that a command to connect screen telephony is received from glasses 200-1 in FIG. 2. In this case, the display may alternately arrange image frame as follows: a left-eye image frame of screen telephony images, a right-eye image frame, a left-eye image frame of Content B, a right-eye image frame . . . , and display the arranged image frame at an operating speed of 240 Hz.

When receiving a command to connect screen telephony from a plurality of glasses, the display 110 may arrange image frames in a following order: a left-eye image frame 1 of screen telephony images, a right-eye image frame 1, a left-eye image frame 1, a right-eye image frame 1, a left-eye image frame 2, a right-eye image frame 2, a left-eye image frame 2, a right-eye image frame 2 . . . and display the arranged image frames at an operating speed of 240 Hz.

Meanwhile, operations of the display 110, the screen telephony performer 130 and the signal processors 160-1, 160-2, . . . , 160-n may be controlled by the controller 140.

According to the display timing of respective contents, the synchronizing signal generator 170 generates synchronizing signals to synchronize glasses corresponding to the respective contents. Specifically, the synchronizing signal generator 170 generates synchronizing signals to synchronize glasses at a display timing of image frames regarding each of a plurality of contents.

The communicator 120 transmits synchronizing signals corresponding to the glasses and audio regarding contents to the glasses. For example, the communicator 120 may generate transmission packets according to a Bluetooth communication protocol and transmit synchronizing signals and audio to the glasses. Meanwhile, the process in which the communicator 120 performs connecting with glasses is already described in relation to FIG. 2, which will not be further explained here.

Transmission packets may include synchronizing signals. Transmission packets may include time information to be synchronized at a display timing of content and to open/close shutter glass of glasses. Specifically, time information may include information on a left shutter open offset, a left shutter close offset, a right shutter open offset, and a right shutter close offset regarding a pair of glasses.

The 'offset time' as used herein indicates delay information from a standard time point established in respective contents until a time point of opening or closing the shutter glass. Accordingly, glasses open or close left-eye shutter glass and right-eye shutter glass, when the offset time elapses from the standard time point.

For example, the standard time point may be a time when vertical synchronizing signals, i.e., frame sync, occur in image frames of contents, and the standard time information may be included in transmission packets. Further, transmission packets may include information about clock signals used in the display apparatus 100. Thus, the glasses synchronize its clock signals with clock signals of the display apparatus 100 when receiving transmission packets, determines whether an offset time arrives from the time when vertical synchronizing signals occur by using the clock signals, and opens or closes the shutter glass. Besides, transmission packets may further include information regarding a frequency of frame sync and information to express decimal point information when the frequency of frame sync has decimal point.

Also, transmission packets may include audio constituting respective contents.

The controller 140 may control the communicator 120 to transmit synchronizing signals and audio corresponding to each of a plurality of contents to the glasses synchronized with respective contents. For example, it is assumed that two content are alternately displayed in FIG. 2. In this case, the controller 140 may control transmitting transmission packet including time information to open or close glasses 200-1 at a display timing of Contents A and audio constituting Content A to glasses 200-1, and control transmitting transmission packets including time information to open or close glasses 200-2 at display timing of Content B and audio constituting Content B to glasses 200-2.

In this case, the controller 140 may use different frequency bandwidths within frequency bandwidths defined in a Bluetooth communication protocol, and transmit each transmission packet to the glasses. In the above exemplary embodiment, the controller 140 may use a preset first frequency bandwidth among defined frequency bandwidths in the Bluetooth communication protocol and transmit transmission packets to glasses 200-1, use a preset second frequency bandwidth and transmit transmission packets to glasses 200-2.

When receiving a command to connect screen telephony from a pair of glasses, the controller 140 may transmit a user's voice received from another display apparatus 100' to the corresponding glasses instead of audio regarding contents. The controller 140 may communicate transmission packets to include synchronizing signals and the user's voice received from another display apparatus 100' and transmit corresponding transmission packets to the glasses transmitting a command to connect screen telephony. When glasses 200-1 transmits a command to connect screen telephony in the above exemplary embodiment, the controller 140 may transmit transmission packets including time information to open or close glasses 200-1 and the user's voice received from another display apparatus 100' to glasses 200-1 based on a display timing of Content A synchronized with glasses 200-1. As described above, the controller 140 may control displaying screen telephony images at a display timing of Content A instead of Content A.

Likewise, when glasses 200-2 transmits a command to connect screen telephony, the controller 140 may transmit transmission packets including time information to open or close glasses 200-2 following to a display timing of Content B and the user's voice received from another display apparatus 100' to glasses 200-2. Also in this case, the controller 140 may control displaying screen telephony images at a display timing of Content B instead of Content B.

FIG. 5 is an example of detailed constitution included in the display apparatus 100; according to an exemplary embodiment, some units illustrated in FIG. 5 may be excluded or modified, and other new units may be added.

FIG. 5 describes that the display apparatus 100 provides multi view mode like a method of FIG. 2.

Thus, if the display apparatus 100 provides a multi view mode like a method of FIG. 2, units may be implemented differently from those of FIG. 5.

The synchronizing signal generator 170 of FIG. 5 may be omitted from the display apparatus 100, and operations of the plurality of signal processors 160-1, 160-2, . . . , 160-*n* and the display 110 may be different from descriptions of FIG. 5.

Specifically, a plurality of the signal processors 160-1, 160-2, . . . , 160-*n* may perform signal-processing regarding contents received from each of the plural receivers 150-1, 150-2, . . . , 150-*n*, and convert respective contents frame to a format that can be outputted in the display 110. For example, regarding an NTSC method, a frame rate that can be displayed in the display apparatus 100 may be 60 frames per second. Therefore, a frame rate of respective contents may be converted to 60 Hz.

A plurality of the signal processors 160-1, 160-2, . . . , 160-*n* may extract horizontal pixel lines from image frames of each content and deliver the horizontal pixel lines to the display 110. For example, signal processor 1 160-1 extracts horizontal pixel line 1 of image frames regarding content 1, signal processor 2 160-2 extracts horizontal pixel line 2 of image frames regarding content 2, and both signal processors deliver the horizontal pixel lines to the display 110.

Horizontal pixel line 1 may be an odd pixel line and horizontal pixel line 2 may be an even pixel line.

The display 110 may use pixel lines delivered from each of the signal processors 160-1, 160-2, form one image frame, and display the formed image frame. Specifically, the display 110 may form one image frame with horizontal pixel line 1 of a content 1 image frame and horizontal pixel line 2 of a content 2 image frame and display the formed image frame.

The display 110 may include a patterned retarder to have different polarized lights per line which are alternately output. For example, images output in horizontal pixel line 1 and horizontal pixel line 2 may have different polarized light directions.

Meanwhile, the screen telephony performer 130 may extract horizontal pixel lines from screen telephony images, and deliver the extracted lines to the display 110. In this case, a horizontal pixel line extracted by the screen telephony performer 130 may be horizontal pixel line 1 or horizontal pixel line 2. Horizontal pixel line 1 may be an odd pixel line and horizontal pixel line 2 may be an even pixel line.

For example, it is assumed that a request for connecting screen telephony is received from glasses 200-1 in FIG. 3. The screen telephony performer 130 may extract horizontal pixel line 1 from screen telephony images and deliver the extracted line to the display 110. The display 110 may form horizontal pixel line 1 of screen telephony images and horizontal pixel line 2 of Content B into one image frame and display the formed image frame.

Likewise, when a request for connecting screen telephony is received from glasses 200-2, the screen telephony performer 130 may extract horizontal pixel line 2 from screen telephony images and deliver the extracted line to the display 110. In this case, the display 110 may form horizontal pixel line 1 of Content A and horizontal pixel line 2 of screen telephony images into one image frame, and display formed image frame.

Meanwhile, such operations may be controlled by the controller 140.

Figure 7:
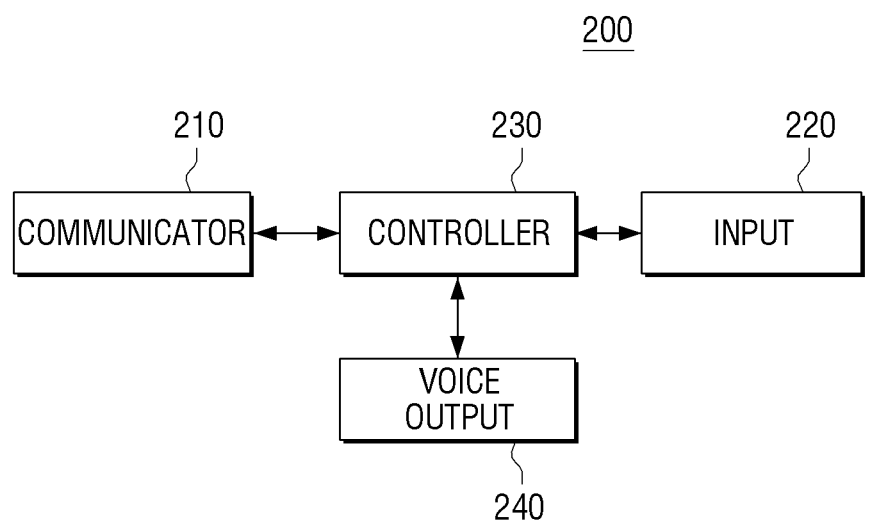
FIG. 7 is a block diagram of glasses according to an exemplary embodiment.

FIG. 7 is a block diagram of glasses according to an exemplary embodiment. Referring to FIG. 7, the glasses 200 includes a communicator 210, an input 220, a controller 230 and a voice output 240. Specifically, the glasses 200 may interoperate with a display apparatus alternately displaying each of a plurality of contents.

The communicator 210 performs communication with the display apparatus 100. The communicator 210 may receive audio regarding contents from the display apparatus 100, and transmit a user's voice collected by the glasses 200 to the display apparatus 100.

Further, the communicator 210 may perform communication with the display apparatus 100 and receive synchronizing signals corresponding to one content from a plurality of contents. Specifically, the communicator 210 may receive synchronizing signals to synchronize the glasses 200 at a display timing of one content from a plurality of contents alternately displayed on the display apparatus 100.

For the communication, the communicator 210 may include a Bluetooth communication module. In this case, the communicator 210 may perform a pairing operation with a Bluetooth communication module mounted in the display apparatus 100 and may be available for communication with the display apparatus 100. For example, the Bluetooth communication module mounted in the communicator 210 may transmit an inquiry message to the display apparatus 100, receive a response message from the display apparatus 100, and perform the pairing operation. Such process is described above by referring to FIG. 2. Meanwhile, if the display apparatus 100 and the communicator 210 are available for communication, the communicator 210 may transmit and receive various data with the display apparatus 100. The input 220 may receive a user manipulation to perform screen telephony with another display apparatus 100'. Meanwhile, when inputting a user manipulation to perform screen telephony with another display apparatus 100', the controller 230 may control the communicator 210 to transmit a command to connect screen telephony to the display apparatus 100, and to receive a user's voice collected in another display apparatus 100' from the display apparatus 100.

In other words, when a user inputs manipulation to perform screen telephony through the input 220, the controller 230 may control the communicator 210 to transmit a command to connect screen telephony to the display apparatus 100. If a command to connect screen telephony is received from the glasses 200, the display apparatus 100 may display screen telephony images received from another display apparatus 100' at a display timing of contents synchronized with the glasses 200. The display apparatus 100 may transmit the user's voice received from another display apparatus 100' to the glasses 200.

The communicator 210 also receives synchronizing signals and a user's voice transmitted by another display apparatus 100' from the display apparatus 100. For example, if the glasses 200 and the display apparatus 100 communicate according to the Bluetooth communication protocol, the communicator 210 may receive synchronizing signals and the user's voice from the display apparatus 100 through transmission packets following the Bluetooth communication protocol. In this case, the communicator 210 may also receive synchronizing signals and the user's voice through a preset frequency bandwidth within frequency bandwidths defined in the Bluetooth communication protocol.

The input 220 may also receive a user manipulation to perform a pairing operation with the display apparatus 100. Thus, the controller 230 may control the communicator 210 to perform the pairing operation with the display apparatus 100 if user manipulation to perform the pairing operation is input.

The input 220 may receive a user manipulation to reject screen telephony. The controller 230 may control the communicator 210 to transmit a command to reject connection to screen telephony to the display apparatus 100 if a user manipulation to reject screen telephony is input.

Further, the input 220 may receive a user manipulation to change channels. The controller 230 may control the communicator 210 to transmit a command to change channels to the display apparatus 100 if a user manipulation to change channels is input. For example, if a command to change channels is received from the glasses 200, the display apparatus 100 may select another channel and display contents received from selected channel at a display timing of contents synchronized with the glasses transmitting a command to change channels.

The input 220 may include various buttons to receive various user manipulations as described above. For example, the input 220 may be implemented as a button receiving a user manipulation to perform screen telephony, a button receiving a user manipulation to perform a pairing operating, and a button receiving a user manipulation to reject screen telephony, which may be mounted on one side of the glasses 200. However, the above is merely an example, and all operations for user manipulation may be received with one button. Therefore, in one exemplary embodiment, one button may be implemented so that if a user presses the button one time, a user manipulation to perform screen telephony is input, if a user presses the button two times, a user manipulation to perform a pairing operation is input, and if a user presses the button three times, a user manipulation to reject screen telephony is input.

The voice output 240 outputs audio. Specifically, when receiving audio constituting contents from the display apparatus 100, the controller 230 may output received audio through the voice output 240.

The voice output 240 also outputs the user's voice. Specifically, when receiving a user's voice from the display apparatus 100, the controller 230 may output the received user's voice through the voice output 240.

For the above processes, the voice output 240 may be implemented as speaker or earphone, and may be arranged toward both of a user's ears when wearing the glasses 200. Alternatively, the voice output 240 may be implemented as only one speaker or earphone, arranged toward only one of a user's ears.

Figure 8:
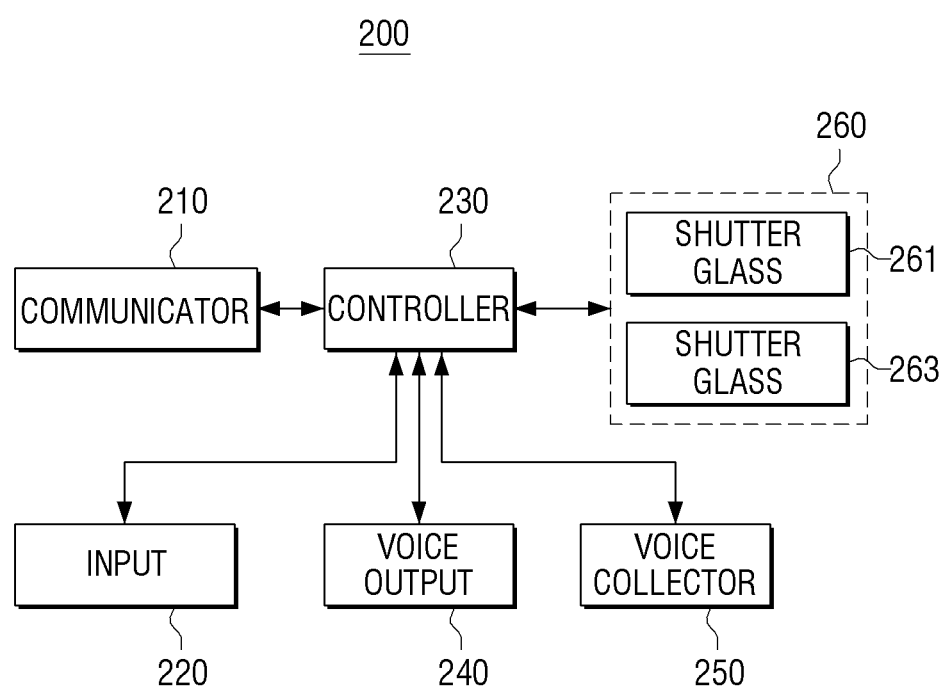
FIG. 8 is a block diagram provided to explain a detailed constitution of glasses according to an exemplary embodiment.

FIG. 8 is a block diagram provided to explain detailed constitution of glasses according to an exemplary embodiment. Referring to FIG. 8, the glasses 200 includes a communicator 210, an input 220, a controller 230, a voice output 240, a voice collector 250 and a shutter glass 260. When explaining FIG. 8, because units having same drawing reference numerals as in FIG. 7 perform the same functions, these will not be described within overlapping scope.

The voice collector 250 collects a user's voice. For example, the voice collector 250 may be implemented as microphone (not illustrated) and may be arranged toward user's mouth when wearing the glasses 200.

The controller 230 may control the communicator 210 to transmit the user's voice collected in the voice collector 250 to the display apparatus 100. Specifically, if the user's voice is collected in the voice collector 250, the controller 230 may control the communicator 210 to transmit the user's voice in transmission packet format according to the Bluetooth communication protocol to the display apparatus 100. Also in this case, the controller 230 may control transmitting the user's voice to the display apparatus 100 through a preset frequency bandwidth among frequency bandwidths defined in the Bluetooth communication protocol.

The shutter glass 260 includes shutter glass 261 and shutter glass 263. Shutter glass 261 may be a left-eye shutter glass and shutter glass 263 may be a right-eye shutter glass, or on the contrary, shutter glass 261 may be a right-eye shutter glass and shutter glass 263 may be a left-eye shutter glass.

Based on synchronizing signals, the controller 230 may control opening shutter glass 261 and shutter glass 263 at a display timing of screen telephony images received from another display apparatus 100'.

Specifically, as explained above, when receiving a command to connect screen telephony from the glass 200, the display apparatus 100 displays screen telephony images received from another display apparatus 100' at a display timing of contents synchronized with the glasses 200. Therefore, based on time information included in the synchronizing signals, the controller 230 may control an open timing of shutter glass 261 and shutter glass 263 at a display timing of contents synchronized with the glasses on the display apparatus 100.

Specifically, because synchronizing information includes time information regarding a display timing of contents synchronized with the glasses 200, the controller 230 may control opening shutter glass 261 and shutter glass 263 at a display timing of contents synchronized with the glasses 200 on the display apparatus 100, and closing shutter glass 261 and shutter glass 263 when other contents is displayed on the display apparatus 100. Meanwhile, as described above, when receiving a command to connect screen telephony from the glasses 200, the display apparatus 100 displays screen telephony images at a display timing of contents synchronized with the glasses 200. A user wearing the glasses 200 can view screen telephony image.

FIG. 8 is an example of detailed constitution included in the glasses 200; according to an exemplary embodiment. Some units illustrated in FIG. 8 may be excluded or modified, or other units may be added.

FIGS. 7 and 8 above describe that the glasses 200 provides a multi view mode like a method of FIG. 2.

However, if the glasses 200 provide a multi view mode like a method of FIG. 3, constitution may be implemented differently from units of FIGS. 7 and 8.

Specifically, the communicator 120 may receive audio regarding contents or a user's voice received from another display apparatus 100' from the display apparatus 100, rather than receiving synchronizing signals.

Additionally, the glasses 200 may include a lens (not illustrated) that projects regular polarized light in a direction instead of the shutter glass 260. Specifically, the glasses 200 may include a left-eye lens (not illustrated) and a right-eye lens (not illustrated). The left-eye lens (not illustrated) and the right-eye lens (not illustrated) may project the same polarized light. For example, the left-eye lens (not illustrated) and the right-eye lens (not illustrated) may be implemented to project polarized light in a polarized light direction of an image out from horizontal pixel line 1 of the display apparatus 100 or a polarized light direction of an image output from horizontal pixel line 2.

Therefore, a user wearing the glasses 200 can view contents outputted from horizontal pixel line 1 or horizontal pixel line 2.

Figure 9:
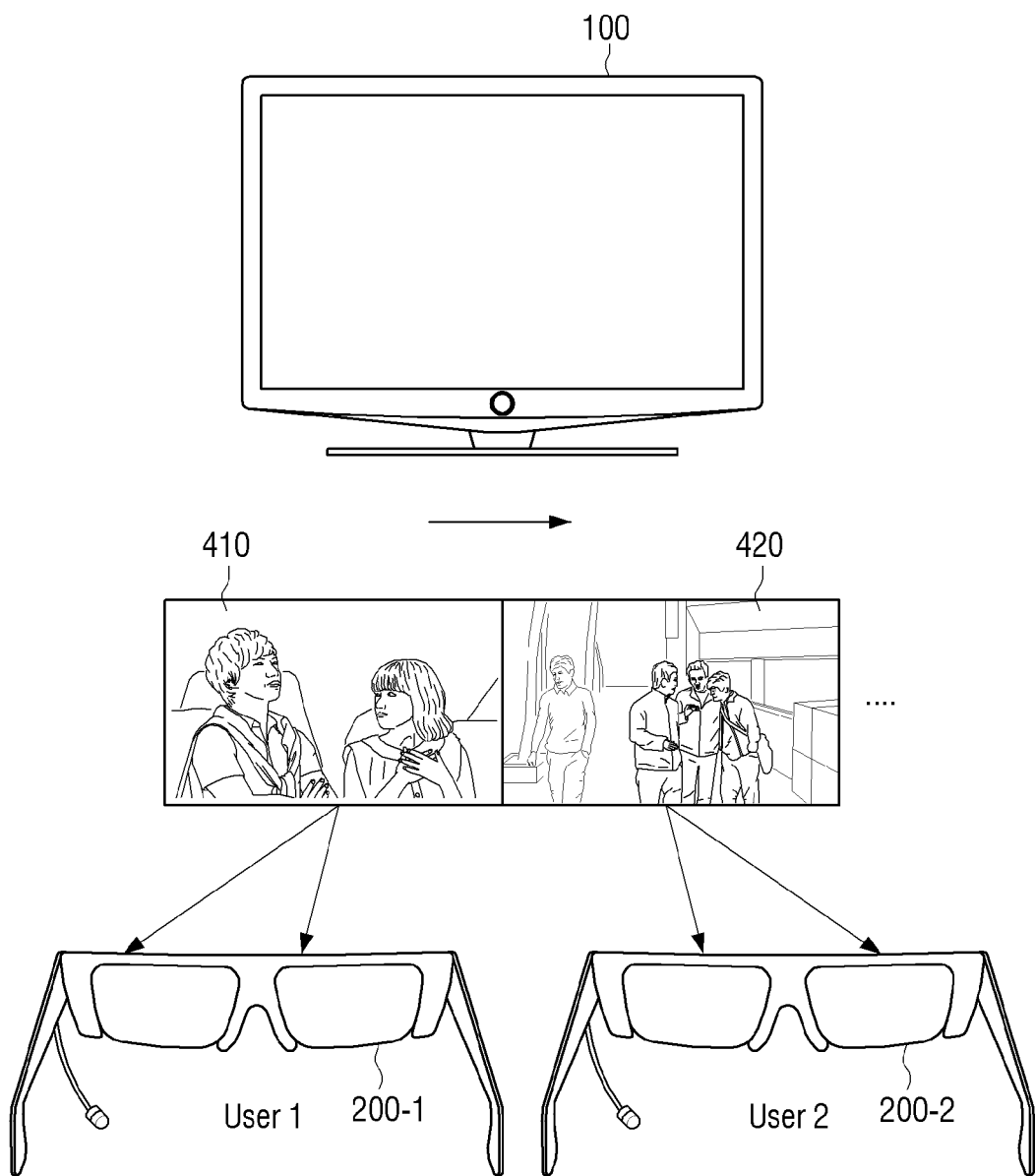
FIGS. 9 and 10 are diagrams provided to explain a user interface (UI) displayed on a screen of a display apparatus according to an exemplary embodiment.
Figure 10:
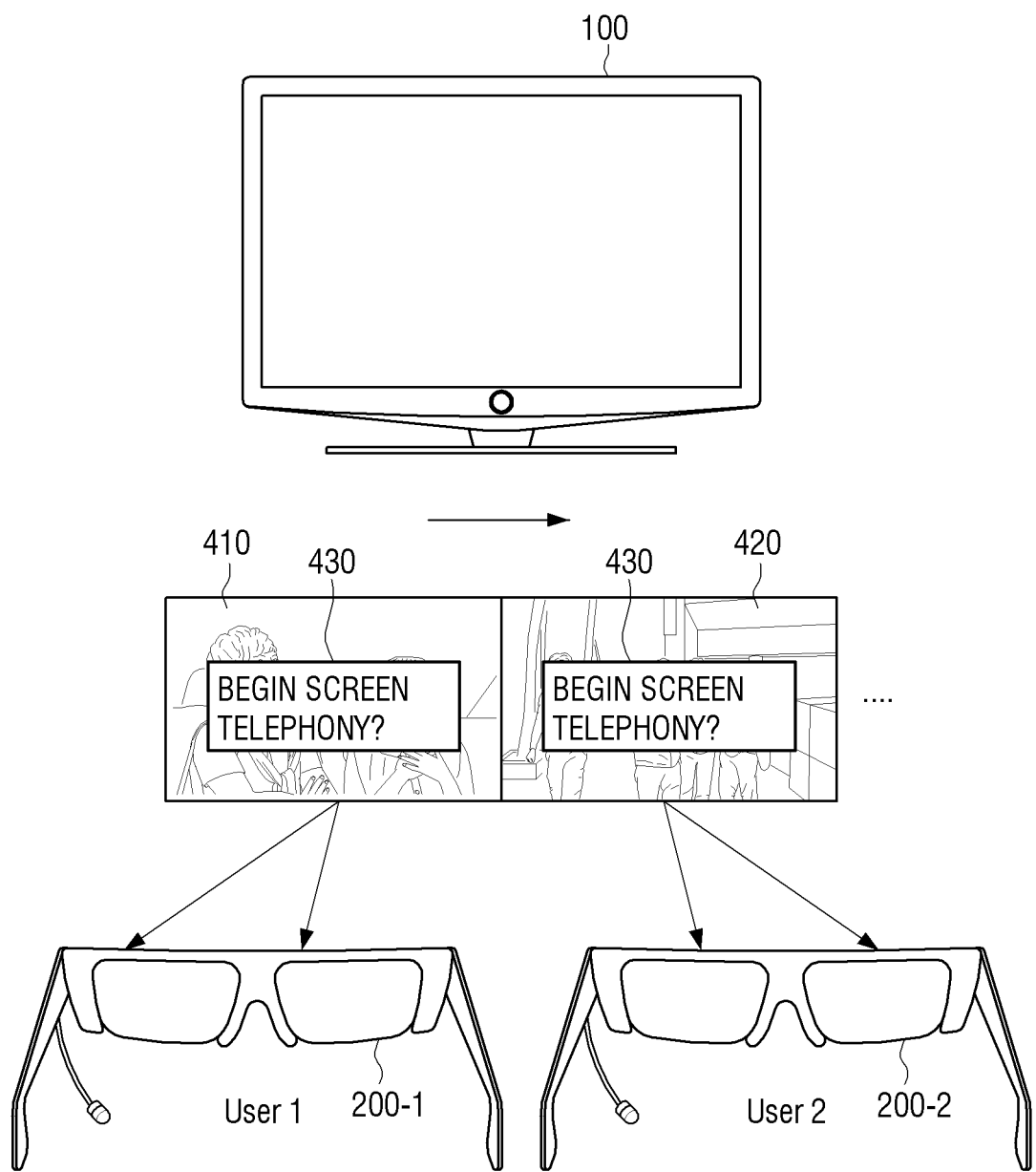

FIGS. 9 and 10 are diagrams provided to explain a user interface (UI) displayed on a screen of a display apparatus according to an exemplary embodiment.

Referring to FIG. 9, the display apparatus 100 alternately displays contents 410 (two people talking) and contents 420 (three people talking), and transmits synchronizing signals corresponding to a display timing of respective contents to glasses 200-1 and glasses 200-2, respectively. User 1 wearing glasses 200-1 in which left-eye and right-eye shutter glasses open at a display timing of contents 410 may view contents 410, and User 2 wearing glasses 200-2 in which left-eye and right-eye shutter glasses open at a display timing of contents 420 may view contents 420.

The display apparatus 100 transmits audio constituting contents 410 to glasses 200-1 and audio constituting contents 420 to glasses 200-2. Thus, User 1 and User 2 may hear audio corresponding to respective contents.

If another display apparatus 100' requests screen telephony to the display apparatus 100, the display apparatus 100 displays a UI screen 430 asking whether to connect screen telephony as shown in FIG. 10.

Specifically, when a request of screen telephony is received from another display apparatus 100', the display apparatus 100 may overlap and display a UI screen 430 asking whether to connect screen telephony with contents 410 synchronized with glasses 200-1 and contents 420 synchronized with glasses 200-2. Therefore, User 1 and User 2 may view the UI screen 430, input a user manipulation to perform or reject screen telephony with a button provided on glasses 200-1 and glasses 200-2, and select whether to perform screen telephony with another display apparatus 100'.

Figure 11:
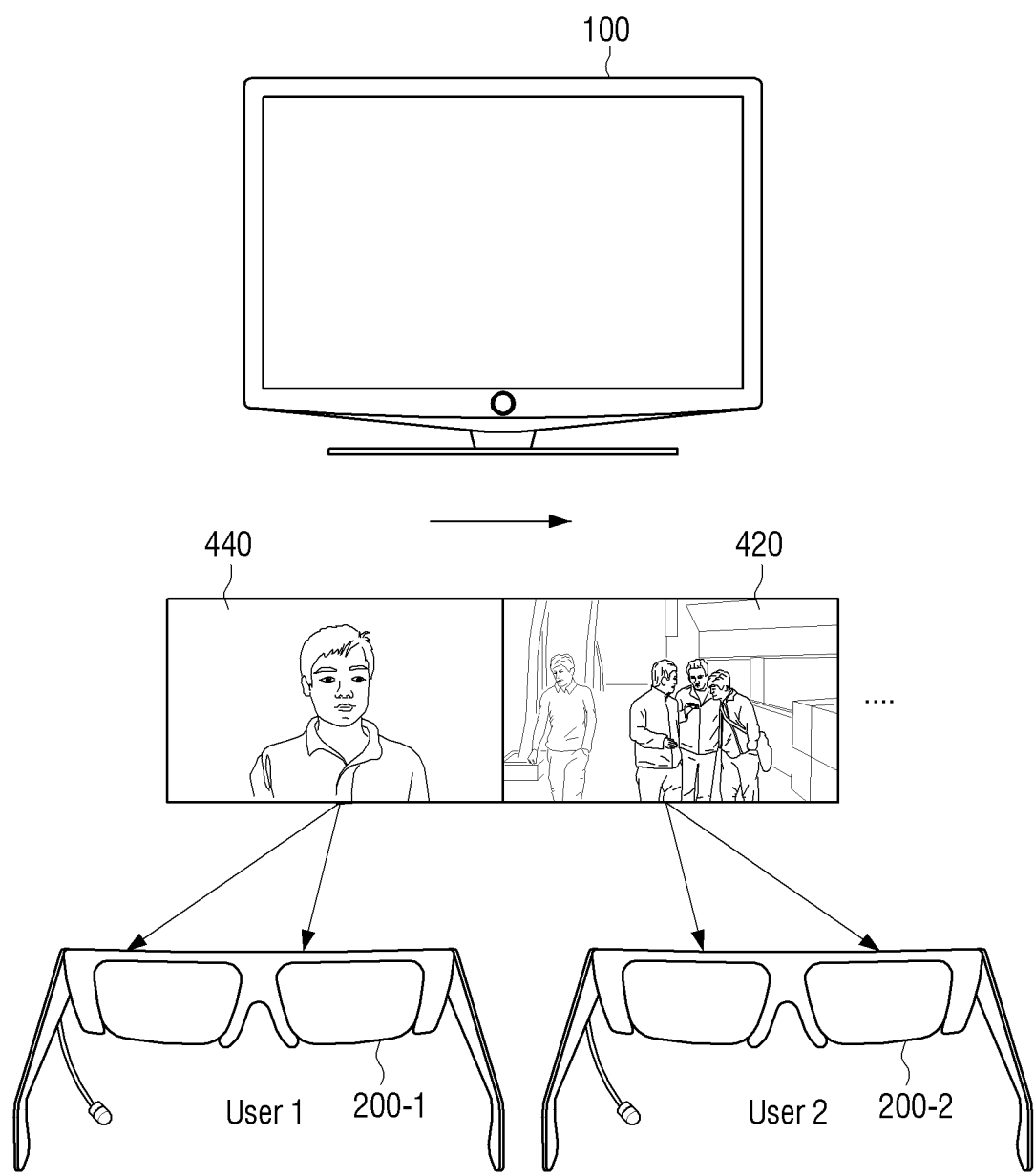
FIGS. 11 and 12 are diagrams provided to explain an operation of performing screen telephony according to an exemplary embodiment.
Figure 12:
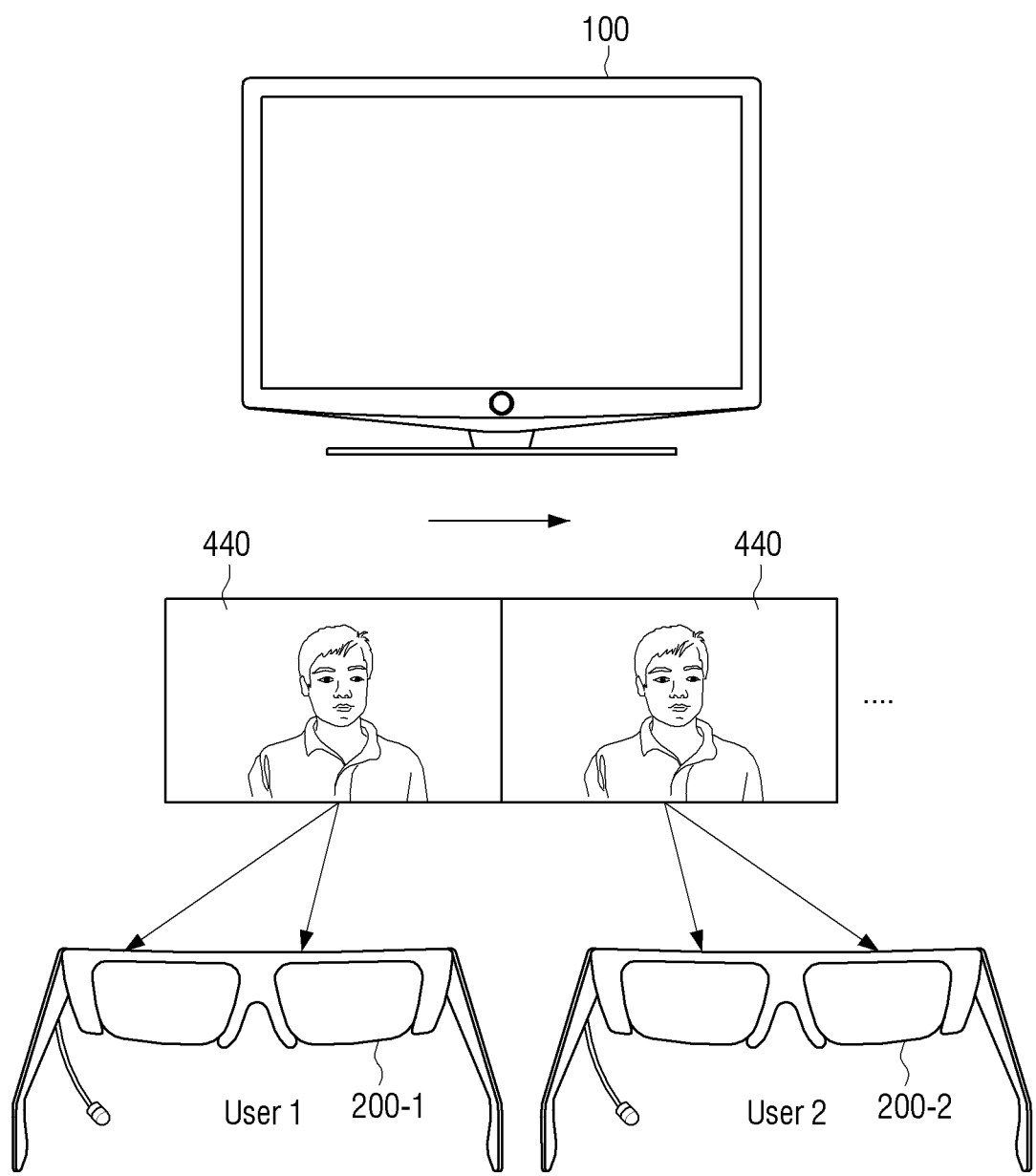

FIGS. 11 and 12 are diagrams provided to explain operations when performing screen telephony according to an exemplary embodiment.

First, FIG. 11 is an exemplary embodiment showing receiving a command to connect screen telephony from glasses 200-1.

Referring to FIG. 11, the display apparatus 100 may stop displaying contents 420 synchronized with glasses 200-1 transmitting a command to connect screen telephony, and display screen telephony image 440 received from another display apparatus 100' at a display timing of contents 420. Thereby, User 1 wearing glasses 200-1 receiving synchronizing signals corresponding to a display timing of contents 420 may view screen telephony image 440.

The display apparatus 100 may stop transmitting audio constituting contents 420, and transmit the user's voice received from another display apparatus 100' to glasses 200-1. Glasses 200-1 may output the user's voice received from the display apparatus 100. Further, glasses 200-1 may transmit the voice of User 1 to the display apparatus 100. Thus, User 1 may perform screen telephony with a user of another display apparatus 100' with glasses 200-1.

Meanwhile, referring to FIG. 11, UI screen 430 overlapped and displayed with contents 420 synchronized with glasses 200-2 disappears. If the display apparatus 100 receives a command to reject connection to screen telephony from glasses 200-2, or if a command to connect screen telephony is not received for a preset time, displaying UI screen 430 may stop.

FIG. 12 is a diagram provided to explain receiving a command to connect screen telephony from glasses 200-1 and glasses 200-2 according to an exemplary embodiment of FIG. 10.

Referring to FIG. 12, the display apparatus 100 may stop displaying contents 420 synchronized with glasses 200-1 and contents 430 synchronized with glasses 200-2, and display screen telephony image 440 received from another display apparatus 100' at a display timing of the respective contents. Therefore, User 1 wearing glasses 200-1 receiving synchronizing signals corresponding to a display timing of contents 420 may view screen telephony image 440, and User 2 wearing glasses 200-2 receiving synchronizing signals corresponding to display timing of contents 430 may view screen telephony image 440.

In this case, the display apparatus 100 transmits the user's voice received from another display apparatus 100' to glasses 200-1 instead of audio constituting contents 420, and transmits the user's voice received from another display apparatus 100' to glasses 200-2 instead of audio constituting contents 430. Glasses 200-1 and glasses 200-2 may transmit a voices of User 1 and a voice of User 2 to the display apparatus 100, respectively.

Thus, User 1 and User 2 may perform screen telephony with a user of another display apparatus 100' through the glasses.

FIGS. 9 to 12 are specific examples which the display apparatus 100 and the glasses 200 provide a multi view mode like a method of FIG. 2. However, even if the display apparatus 100 and the glasses 200 provide a multi view mode like a method of FIG. 3, a user may perform screen telephony with another display apparatus 100' through the display apparatus 100 and the glasses 200.

Figure 13:
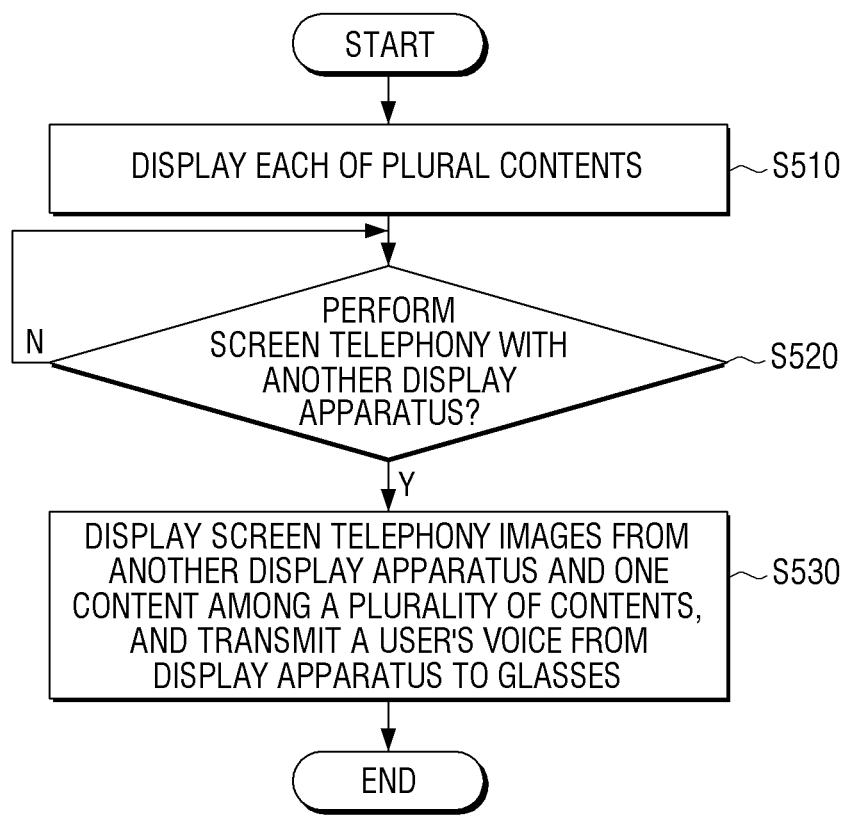
FIG. 13 is a flowchart provided to explain a controlling method of a display apparatus according to an exemplary embodiment.

FIG. 13 is a flowchart provided to explain a controlling method of a display apparatus according to an exemplary embodiment. The display apparatus may interoperate with glasses.

At S510, a plurality of contents are display respectively.

It is then determined whether to perform screen telephony with another display device at S520. When screen telephony is performed with another display apparatus 100' (S520-Y), the user's voice received from another display apparatus are transmitted to the glasses, and a screen telephony image received from another display apparatus and one content of the plurality of contents is displayed in multi view mode at S530.

Further, according to an exemplary embodiment, synchronizing signals corresponding to the one content of the plurality of contents may be transmitted by communicating with the glasses.

The user's voice collected in the glasses may be received. Further, screen telephony images generated by photographing a user and the user's voice received from the glasses may be transmitted to another display apparatus 100', and, screen telephony images generated in another display apparatus 100' and the user's voice collected in another display apparatus 100' may be received from another display apparatus 100'.

According to an exemplary embodiment, when receiving a request for connecting screen telephony from another display apparatus 100', a UI screen asking whether to connect screen telephony may be overlapped and displayed on a plurality of contents respectively. Specifically, the UI screen may be overlapped and displayed with each image frame of the plurality of contents alternately displayed. For example, it may be so controlled that the screen may be displayed in the following forms: image frame of content 1+UI screen, image frame of content 2+UI screen, image frame of content 1+UI screen, image frame of content 2+UI screen . . . . Therefore, users wearing the glasses may view whether another display apparatus 100' requests connecting screen telephony from the UI screen.

At S510, when receiving a command to connect screen telephony from the glasses, screen telephony images received from another display apparatus 100' may be displayed at a display timing of contents synchronized with the glasses so as to alternately display one content among a plurality of contents and screen telephony images received from another display apparatus 100'.

In other words, it may be controlled so that instead of the synchronized contents with the glasses transmitting a command to connect screen telephony, screen telephony images received from another display apparatus 100' may be displayed, in which case a user wearing the glasses transmitting a command to connect screen telephony can view screen telephony image.

At S510, when receiving a command to connect screen telephony from the glasses, screen telephony image received from another display apparatus 100' may be overlapped and displayed at a display timing of one content and another content from among the plurality of contents.

When receiving a command to connect screen telephony from the glasses synchronized with at least two contents among a plurality of contents alternately output, screen telephony images may be overlapped and displayed at display timings of corresponding contents respectively.

FIG. 14 is a flowchart provided to explain a controlling method of glasses according to an exemplary embodiment.

It is determined at S610 whether a user manipulation is input. When user manipulation to perform screen telephony with another display apparatus is input (S610-Y), a command to connect screen telephony is transmitted to the display apparatus 100, and the user's voice collected by another display apparatus 100' is received from the display apparatus 100 at S620.

At S630, the user's voice is output.

Meanwhile, according to an exemplary embodiment, synchronizing signals corresponding to one content among a plurality of contents may be received.

When receiving a command to connect screen telephony from the glasses, the display apparatus 100 may display screen telephony images received from another display apparatus 100' at a display timing of contents synchronized with the glasses.

According to an exemplary embodiment, a left-eye shutter glass and a right-eye shutter glass may open at a display timing of screen telephony image received from another display apparatus 100' based on synchronizing signals.

Further, a user's voice that is collected may be transmitted to the display apparatus 100. In this case, the user's voice may be transmitted to the display apparatus 100 by using a Bluetooth communication method.

Meanwhile, because exemplary embodiments of FIGS. 13 and 14 are already described, descriptions within overlapping scope and relevant illustrations will not be further explained. The above exemplary embodiment describes a method for providing a multi view mode if a display apparatus and glasses are implemented as in FIG. 2; however, even if implemented as in FIG. 3, a multi view mode may be provided. Further descriptions are referred to the above.

Programs to implement methods according to various exemplary embodiments may be stored and used in various types of recording medium.

Specifically, codes to implement the above methods may be various types of recording medium that a terminal can read such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory and CD-ROM.

The foregoing exemplary embodiments and advantages are merely exemplary and are not to be construed as limiting. The present inventive concept can be readily applied to other types of apparatuses. Also, the description of the exemplary embodiments of the present inventive concept is intended to be illustrative, and not to limit the scope of the claims.

What is claimed is:

1. A display apparatus for providing a multi view mode along with a plurality of glasses, the display apparatus comprising:
   a communicator which communicates with the plurality of glasses;
   a display which displays a plurality of contents respectively;
   a screen telephony performer which performs screen telephony with another display apparatus; and
   a controller which controls the communicator to transmit a user's voice received from the another display apparatus to a glasses which transmits a command for connecting the screen telephony, among the plurality of glasses, and to stop transmission of content audio to the glasses, and which controls the display to display screen telephony images received from the another display apparatus and one content from among the plurality of contents in the multi view mode in response to the screen telephony with another display apparatus being performed,
   wherein, in response to receiving a request for connecting screen telephony from the another display apparatus, the controller controls so that a user interface (UI) screen asking whether to connect screen telephony is overlapped and displayed on each of the plurality of contents.

2. The display apparatus of claim 1, wherein the communicator transmits synchronizing signals corresponding to the one content from among the plurality of contents.

3. The display apparatus of claim 1, wherein the communicator receives a user's voice collected at the glasses, and the screen telephony performer comprises:
   a camera which photographs a user wearing the glasses and generates screen telephony images; and
   an interface which transmits the photographed screen telephony images and the collected user's voice to the another display apparatus, and receives screen the telephony images generated at the another display apparatus and the user's voice collected at the another display apparatus from the another display apparatus.

4. The display apparatus of claim 1, wherein, in response to receiving a command to connect screen telephony from the glasses, the controller controls so that the screen telephony images received from the another display apparatus are displayed at a display timing of contents synchronized with the glasses so as to alternately display one content from among the plurality of contents and the screen telephony images received from the another display apparatus.

5. The display apparatus of claim 1, wherein, in response to receiving a command to connect screen telephony from the glasses, the controller controls so that the screen telephony images received from the another display apparatus are overlapped and displayed at a display timing of one content and at a display timing of the other contents, from among the plurality of contents.

6. The display apparatus of claim 1, wherein the communicator comprises a Bluetooth communication module.

7. Glasses comprising:
   a communicator which communicates with a display apparatus;
   an input which receives a user manipulation to perform screen telephony with another display apparatus;

a controller which controls the communicator to transmit a command to connect screen telephony to the display apparatus and to receive from the display apparatus a user's voice collected at the another display apparatus, in response to the user manipulation being input; and
a voice output which outputs the received user's voice,
wherein, in response to receiving a request for connecting screen telephony from the another display apparatus, the display apparatus controls so that a user interface (UI) screen asking whether to connect screen telephony is overlapped and displayed on each of the plurality of contents,
wherein the display apparatus transmits a user's voice received from the another display apparatus to the glasses which transmits a command for connecting the screen telephony, among a plurality of glasses, and to stop transmission of content audio to the glasses and displays screen telephony images received from the another display apparatus and one content from among the plurality of contents in the multi view mode in response to the screen telephony with another display apparatus being performed.

8. The glasses of claim 7, wherein the communicator communicates with the display apparatus and receives synchronizing signals that correspond to one content from among a plurality of contents.

9. The glasses of claim 8, wherein the display apparatus displays screen telephony images received from the another display apparatus at a display timing of the contents synchronized with the glasses, in response to receiving the command to connect screen telephony from the glasses.

10. The glasses of claim 8, further comprising:
a first shutter glass; and
a second shutter glass,
wherein the controller controls so that the first shutter glass and the second shutter glass are open at a display timing of screen telephony images received from the another display apparatus based on the synchronizing signals.

11. The glasses of claim 7, further comprising:
a voice collector which collects a voice of a user wearing the glasses,
wherein the controller controls the communicator to transmit the user's voice collected at the voice collector to the display apparatus.

12. The glasses of claim 7, wherein the communicator comprises a Bluetooth communication module.

13. A controlling method of a display apparatus for providing a multi view mode along with a plurality of glasses, the controlling method comprising:
displaying a plurality of contents respectively;
overlapping and displaying on each of the plurality of contents a user interface (UI) screen asking whether to connect screen telephony images, in response to receiving a request for connecting screen telephony from another display apparatus; and
in response to command connecting, transmitting a user's voice received from the another display apparatus to a glasses which transmits a command for connecting the screen telephony, among the plurality of glasses, and to stop transmission of content audio to the glasses, and displaying to display screen telephony images received from the another display apparatus and one content from among the plurality of contents in a multi view mode in response to the screen telephony with another display apparatus being performed.

14. The controlling method of claim 13, further comprising:
performing communication with the glasses and transmitting synchronizing signals that correspond to the one content from among the plurality of contents.

15. The controlling method of claim 13, further comprising:
receiving a user's voice collected at and transmitted from the glasses;
transmitting screen telephony images generated by photographing a user, and the user's voice received from the glasses, to the another display apparatus; and
receiving from the another display apparatus the screen telephony images generated at the another display apparatus and the user's voice collected at the another display apparatus.

16. The controlling method of claim 13, wherein the displaying comprises displaying the screen telephony images received from the another display apparatus at a display timing of contents synchronized with the glasses so as to alternately display the one contents of the plurality of contents and the screen telephony images received from the another display apparatus, in response to receiving a command to connect screen telephony from the glasses.

17. The controlling method of claim 13, wherein the displaying comprises overlapping and displaying the screen telephony image received from the another display apparatus at a display timing of the one content and the other contents from among the plurality of contents, in response to receiving a command to connect screen telephony from the glasses.

18. The controlling method of claim 14, wherein the transmitting comprises transmitting the synchronizing signals to the glasses by using a Bluetooth communication method.

19. A controlling method of glasses, the controlling method comprising:
overlapping and displaying on each of the plurality of contents a user interface (UI) screen asking whether to connect screen telephony images, in response to receiving a request for connecting screen telephony from another display apparatus
receiving a user command connecting;
transmitting a command to connect screen telephony to a display apparatus and receiving a user's voice collected at the another display apparatus from the display apparatus, in response to receiving the user manipulation; and
outputting the received user's voice,
wherein the display apparatus transmits a user's voice received from the another display apparatus to the glasses which transmits a command for connecting the screen telephony, among a plurality of glasses, and to stop transmission of content audio to the glasses and displays screen telephony images received from the another display apparatus and one content from among the plurality of contents in the multi view mode in response to the screen telephony with another display apparatus being performed.

20. The controlling method of claim 19, further comprising:
receiving synchronizing signals corresponding to one content from among the plurality of contents.

21. The controlling method of claim 20, wherein the display apparatus displays the screen telephony image received from the another display apparatus at a display timing of the contents synchronized with the glasses, in response to receiving a command to connect screen telephony from the glasses.

22. The controlling method of claim 20, wherein the glasses include a first shutter glasses and a second shutter glasses, the method further comprising:
   opening the first shutter glasses and the second shutter glasses at a display timing of the screen telephony images received from the another display apparatus based on the synchronizing signals.

23. The controlling method of claim 19, further comprising:
   collecting a user's voice of a user wearing the glasses; and
   transmitting the collected the user's voice to the display apparatus.

* * * * *